United States Patent
Mark et al.

(10) Patent No.: US 6,803,912 B1
(45) Date of Patent: Oct. 12, 2004

(54) REAL TIME THREE-DIMENSIONAL MULTIPLE DISPLAY IMAGING SYSTEM

(75) Inventors: David Mark, San Francisco, CA (US); Brett C. Weichers, Cedar Falls, IA (US)

(73) Assignee: Mark Resources, LLC, San Francisco, CA (US)

( * ) Notice: Subject to any disclaimer, the term of this patent is extended or adjusted under 35 U.S.C. 154(b) by 350 days.

(21) Appl. No.: 09/921,090

(22) Filed: Aug. 2, 2001

(51) Int. Cl.[7] ............................................. G06T 15/10
(52) U.S. Cl. ....................................... 345/427; 345/473
(58) Field of Search .............................. 345/427, 473, 345/419, 629, 474, 472; 700/83

(56) References Cited

U.S. PATENT DOCUMENTS

| | | |
|---|---|---|
| 5,495,576 A | 2/1996 | Ritchey |
| 5,564,000 A | 10/1996 | Halpern |
| 5,990,972 A | 11/1999 | Bond-Harris et al. |
| 6,072,478 A | 6/2000 | Kurihara et al. |
| 6,256,061 B1 | 7/2001 | Martin et al. |
| 6,282,455 B1 * | 8/2001 | Engdahl ........................ 700/83 |
| 6,329,994 B1 * | 12/2001 | Gever et al. .................. 345/473 |
| 6,331,861 B1 * | 12/2001 | Gever et al. .................. 345/629 |
| 2002/0118194 A1 * | 8/2002 | Lanciault et al. ............ 345/473 |
| 2004/0012594 A1 * | 1/2004 | Gauthier et al. ............. 345/473 |

* cited by examiner

Primary Examiner—Haissa Philogene
Assistant Examiner—Huedung X. Cao
(74) Attorney, Agent, or Firm—Jefferson Perkins Daspin & Aument, LLP

(57) ABSTRACT

A real time three dimensional multiple display imaging system has a central processing node and a plurality of remote, virtual camera processors. Each of the virtual cameras has its own predetermined viewpoint and is capable of displaying a scene into a virtual world from that viewpoint. The virtual world and the objects displayed in it are controlled by the central processing node. Geometric and textural data concerning the objects are stored in advance by memories associated with each one of the virtual cameras, thereby reducing the amount of communication bandwidth necessary for real-time animation.

53 Claims, 13 Drawing Sheets

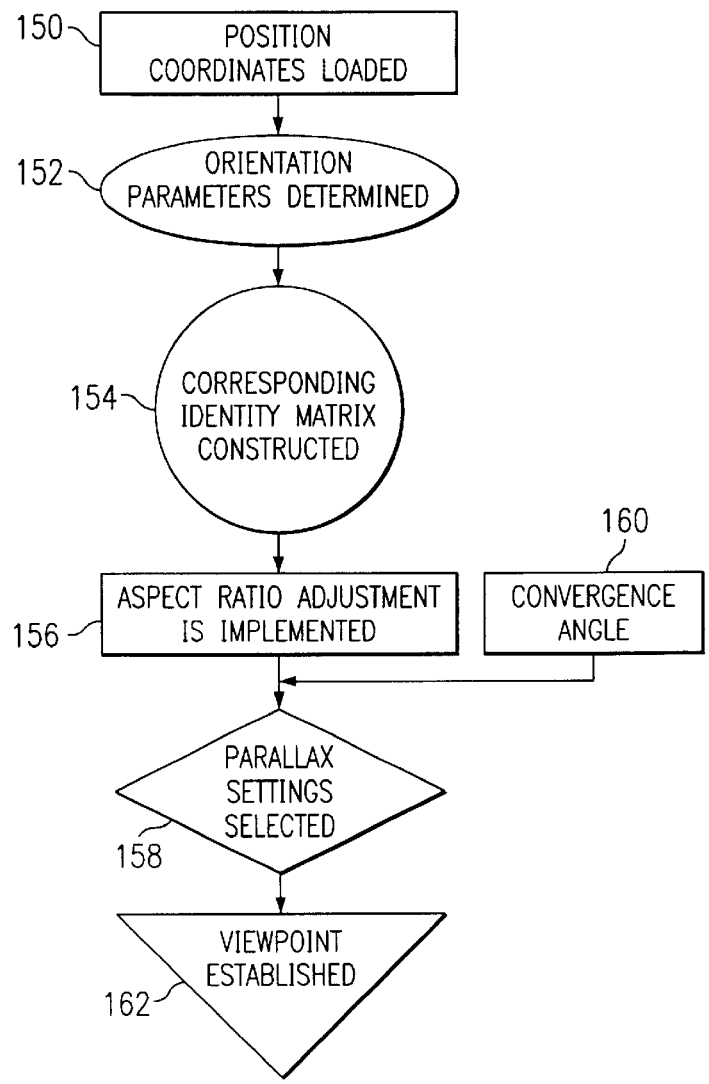
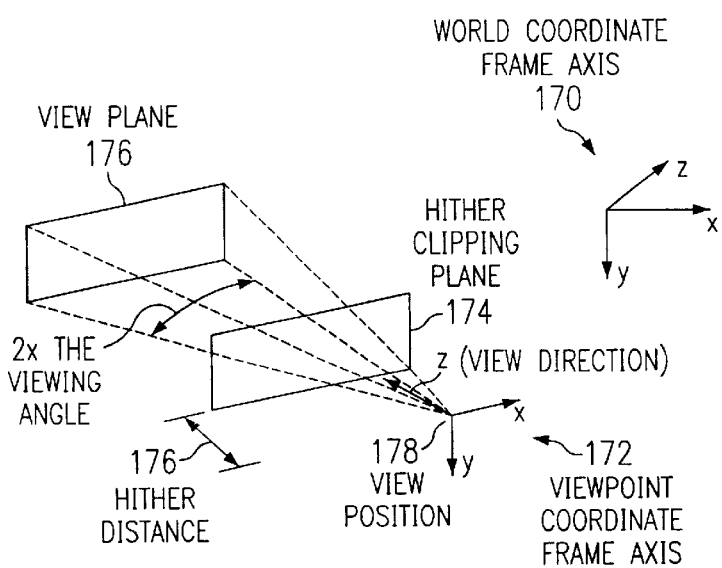

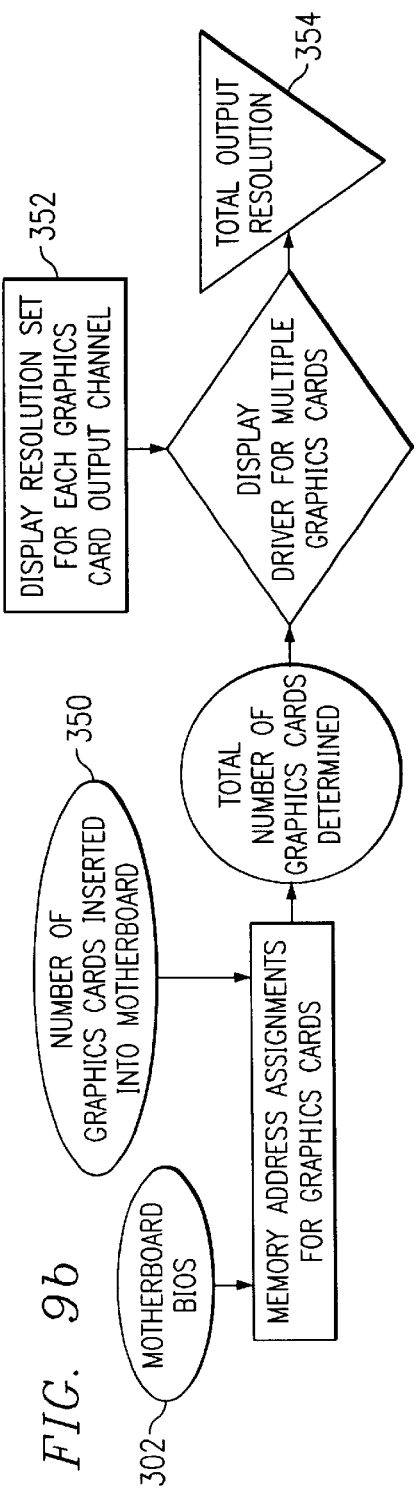
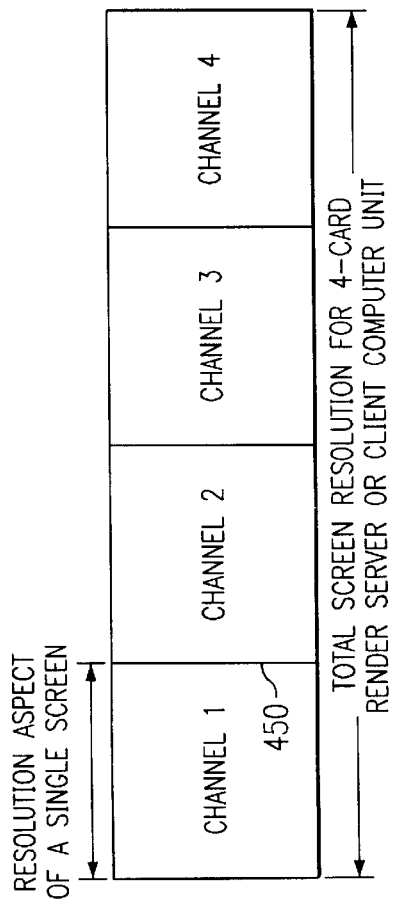
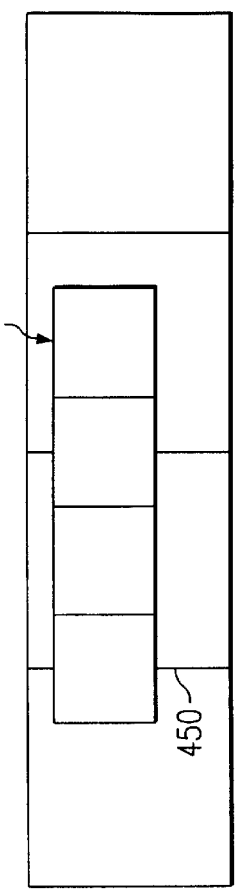

REAL TIME THREE-DIMENSIONAL MULTIPLE DISPLAY IMAGING SYSTEM

TECHNICAL FIELD OF THE INVENTION

The present invention relates in general to imaging systems, and more particularly to real time three-dimensional multiple display imaging systems displaying animated images from varying viewpoints.

BACKGROUND OF THE INVENTION

As display screens have grown in size and fineness of resolution, investigators have experimented with placing several such display screens adjacent to each other and causing three dimensional graphical data to be displayed on them. In 1992, the University of Illinois introduced a multi-user, room-sized immersive environment called the Pyramid CAVE (for "CAVE automatic virtual environment"). Three dimensional graphics were projected onto the walls and floors of a large cube composed of display screens, each typically measuring eight to ten feet. The cubic environment uses stereoscopic projection and spatialized sound to enhance immersion. Computers and display systems by Silicon Graphics, Inc. have created multi-panel displays which process three dimensional graphics, imaging and video data in real time. However, known "CAVES" and light displays by SGI and others share a single apex point of view, with all panels around the viewers having only perspective views streaming from that apex point. Further, much of the prior work requires shuttered or Polaroid glasses on the viewer for stereoscopic output. A need therefore continues to exist for multiple-display imaging systems permitting the imaging of three-dimensional scenes from multiple perspectives. Further, the treatment of animation graphics across multiple displays currently requires extremely high end, custom hardware and software and large bandwidth capability. The cost and communication requirements or rendering and displaying animation across multiple displays should be reduced.

SUMMARY OF THE INVENTION

According to one aspect of the invention, a multiple-display video system and method are provided by which a rendering image processor is coupled to a plurality of virtual cameras, which in one embodiment occupy separate nodes on a network. Associated with the rendering image processor is a first memory that defines a world having three dimensional spatial coordinates, a second memory for storing graphical image data for a plurality of objects, and a third memory for storing instructions on the positioning of the objects in the world. For each virtual camera, a viewpoint of the world is defined and stored. The rendering image processor renders a scene of the world according to the viewpoint of the virtual camera. Each virtual camera has at least one display associated with it to display the scene rendered according to the virtual camera's viewpoint. The virtual camera viewpoints may be chosen to be different from each other.

According to a second aspect of the invention, a rendering node or server has first, second and third memories as above defined, the third memory storing instructions for positioning the objects in the virtual world and animating these objects. A plurality of clients, which are preferably disposed remotely from the server, each have associated memory and processing capability. Each of the clients has one or more display units associated with it, and viewpoints are established for each. Each of the clients stores, prior to a first time, graphical image data for the objects to be displayed. Each of the clients constructs a respective scene based on instructions received from the server at the first time. The previous storage of the graphical image data (such as textural and geometric data) associated with the animated objects dramatically reduces the amount of bandwidth necessary to communicate animation instructions from the server to each of the clients, permitting real-time animation effects across a large number of associated displays.

In a third aspect of the invention, these displays may be physically sited to be contiguous with each other so as to create a single large display. Relatedly, contiguous displays can be directed to display the scene or overlapping scenes and the viewpoints of the displays can be varied so that, to an observer passing by the displays, the rendered scene appears to shift as a function of the position of the observer, such as it would if the observer were looking at a real scene through a bank of windows. Other viewpoint shifts are possible to produce, e.g., arcuate or circumferential virtual camera arrays, of either convex or concave varieties.

According to a fourth aspect of the invention, a large multiple-screen animated array may be provided at a commercial location and used to display a combination of animations and text data derived from a local database. These data, such as the Flight Information Data System (FIDS) of an airline at an airport, can be used to display such things as airline arrivals and departures on predetermined portions of the displays. The present invention provides apparatus for producing an overlay of the FIDS data on the animated sequences.

According to a fifth aspect of the invention, the method and system of the invention may be used to illuminate large lenticular arrays to create an autostereoscopic display.

BRIEF DESCRIPTION OF THE DRAWINGS

Further aspects of the invention and their advantages will be discerned with reference to the following detailed description when taken in conjunction with the drawings, in which like characters identify like parts and in which:

FIG. 3 is a viewpoint configuration or virtual camera protocol process flow diagram, and is a detail of FIG. 2;

FIG. 4 is a schematic diagram of parameters establishing a viewpoint for a virtual camera;

FIG. 7b is a schematic block diagram of a client process corresponding to the rendering server process shown in FIG. 7a;

FIG. 9b is a block diagram showing calculation of total output resolution;

FIG. 11a is a block diagram showing placement of multiple channels or stations to constitute a single, extended-length display;

FIG. 11b is a diagram showing the superposition of text data on the display illustrated in FIG. 11a;

DETAILED DESCRIPTION OF ILLUSTRATED EMBODIMENT

Figure 1:
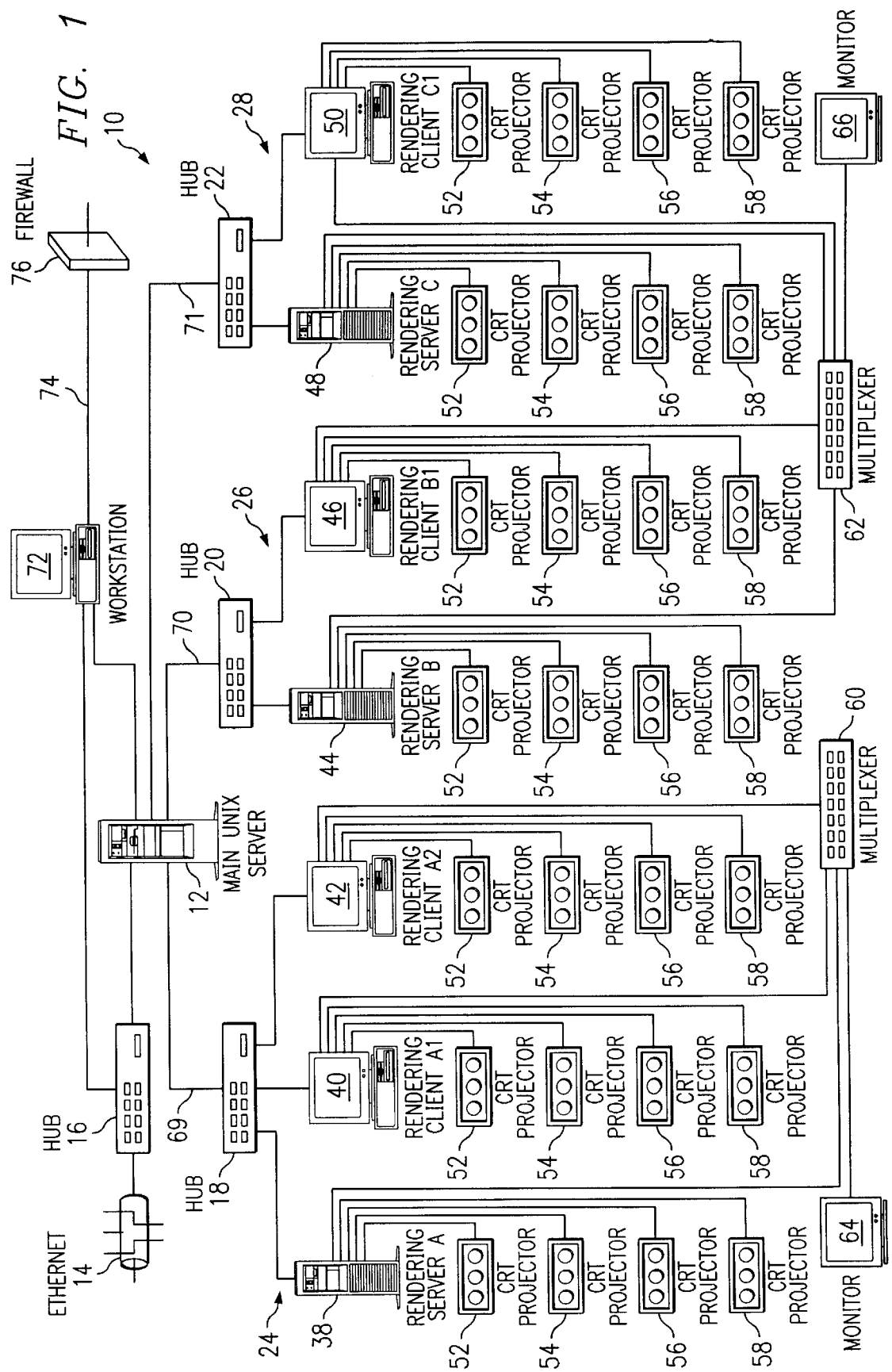
FIG. 1 is a high-level schematic network diagram for a video projection array according to the invention.

FIG. 1 illustrates a representative layout of a contiguous video projection array according to the invention, the illustrated embodiment being an airport terminal display system that displays animated graphics and a text data overlay from a flight information data system (FIDS) database. In FIG. 1, the video projection array system, indicated generally at 10, includes a main server 12 which accepts FIDS data or data from any other text source, such as may be presented in Oracle or SGL, through an internal Ethernet port 14 as joined by a high speed switching hub 16. The hub 16 makes it possible for multiple sourcing of the FIDS data for several isolated imaging arrays, only one such array 10 being shown in FIG. 1. The preferably UNIX-based main server 12 transceives data through a series of separate switching Ethernet hubs 18, 20 and 22. Each of the hubs 18–22 is directly linked to one or more groups 24–28 of imaging or rendering computers 38–50.

Each of the hubs 18–22 has associated with it a respective rendering server 38, 44 or 48. The rendering server 38 controls clients 40 and 42 through hub 18. The rendering server 44 controls a client 46 through hub 20. The rendering server 46 controls a client 48 through hub 22. The rendering servers 38, 44 and 48 and their respective clients 40–42, 46, 50 together constitute the imaging computers 38–50 that run the multipanel displays in the embodiment illustrated in FIG. 1. The rendering servers 38, 44, 48 have at least the same capacity and resolution capability as their client counterparts 40–42, 46, 50 and in the illustrated embodiment all contain four video channel outputs and four corresponding logical or virtual cameras generating output on these video channels. Using current hardware, a maximum number of eight video channels per imaging computer 38–50 can be used. The imaging computers 38–50 may in general have minicomputer architecture, and may use any of several operating systems such as Windows NT, Windows 2000 or LINUX 6.3.

Server/client groups 24, 26 and 28 preferably are kept isolated from each other by the use of hubs 18–22 to prevent unnecessary cross talk. Each of the imaging computers 38–50 has a set 52, 54, 56, 58 of projectors, each projector 52–58 being controlled by a "virtual camera" set up by the software as will be described below and accepting one video channel output from a respective controlling imaging computer 38–50. The illustrated CRT projectors 52–58 are exemplary only in kind and number and are one of many possible kinds of display units, which also include rear projectors, various kinds of flat panel displays or autostereoscopic projection screens (see FIG. 15 and its accompanying discussion below). The video projectors or other display units 52–58 may be sequenced from left to right or from top to bottom, may provide rear screen or front screen projection imagery, and may be of any size or of any specific resolution. As making up a video wall, the projection units 52–58 are preferably equal in resolution to each other and should provide a contiguous composite image.

The system 10 also includes a plurality of video multiplexers 60, 62, each of which accepts one or more channels per client workstation 38–50. The multiplexers 60, 62 are used to relay video signals from the imaging computers 38–50 to a monitoring station at which are positioned monitors 64, 66 for user-induced functional changes, imagery updating or image alignment as may be necessary for a particular type of video wall or other multiunit display. A single monitor 64 or 66 may be connected to each of the multiplexers 60, 62, so as to be capable of instantaneous switching between the large number of video channels present.

The server 12 further provides high speed conduits 69, 70, 71 with each of the hubs 18, 20 and 22 while keeping those hubs 18–22 effectively isolated from each other. As controlled by an overall executable program on main server 12, conduits 69–71 may pass packets of positional data or sequencing information that relay positioning and rendering queues among the rendering servers 38, 44, 48. The conduits 69–71 further simultaneously transmit FIDS text data as overlay text information on animations displayed on the (e.g.) video wall created by units 52–58.

A further workstation 72, which may be UNIX-based, monitors activity on the entire system through main server 12. Workstation 72 also supports a link 74 to the outside world, through firewall 76. The external connection permits data pertaining to the imaging array to be accessed remotely through the firewall 76, and permits remote network management of the system. For example, artwork shown on the video wall constituted by projection units 52–58 may be transformed or reconstituted by commands issued remotely, and may also be viewed remotely to verify image quality and stability. The *.cfg file, described below and copied to each of the rendering computers 38, 44, 48, contains animation start functions and further permits the recognition of an interrupt sent from the workstation 72 in order to effect changes in the animation. Path 74 may be used to load new sets of textures and geometries onto the hard drive storage of server 12, and thence to rendering servers 38, 44, 48, in order to partly or completely replace the imagery shown on the video wall, nearly instantaneously. In the illustrated embodiment, it is preferred that these changes be done by replacing the old *.cfg file with a new one.

System 10 is modular in its design, easily permitting the addition of further rendering servers and associated client imaging computers, with no theoretical upward limit to the number of video channels to be included in the total system.

Figure 14:
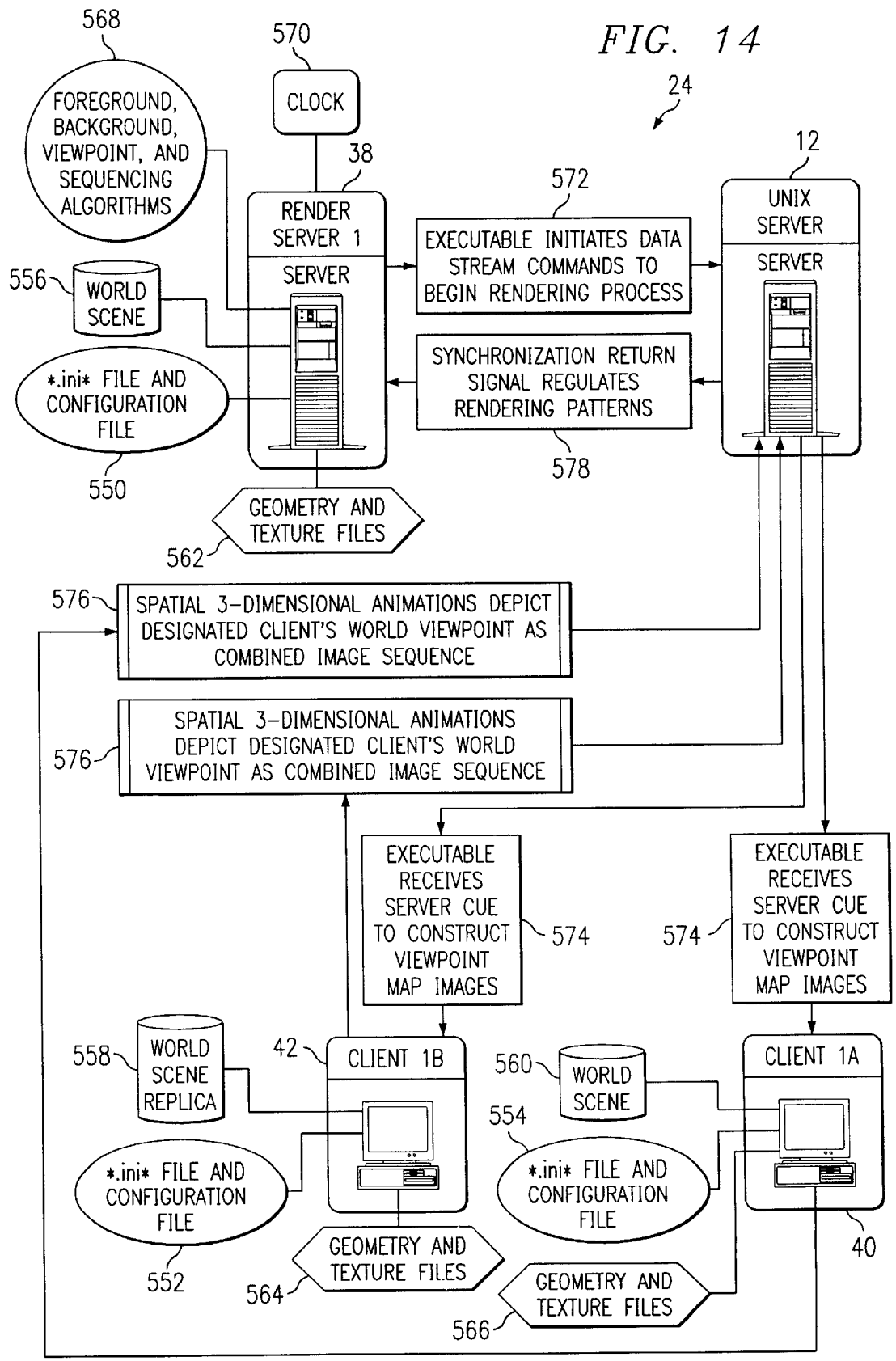
FIG. 14 is a high-level schematic block diagram showing a portion of a system using the invention, and the execution, data transfer and storage of software and electronic data components thereof.

FIG. 14 is a schematic diagram of a single server/client group 24 of the networked group of computers illustrated in FIG. 1. This diagram shows where different ones of the software elements of the system are installed on which of the imaging computers. The server 38 and each of the clients 40, 42 have an executable initiation or "*.ini" file and a configuration or "*.cfg" file 550, 552, 554 stored on their hard drives. Within any server group, the *.cfg files will be identical to each other, and the *.ini files nearly so. These two files work in tandem. The *.ini file uses listed parameters to define (a) how many sequential images will be loaded either into the rendering servers 38, 44, 48 or into the various client computer stations 40–42, 46, 50 linked thereto; (b) the functions, sequences and timing of the animation; (c) the number of imaging computers 38–50 that may exist on the hub node; and (d) the manner in which sequences of images are assigned to respective graphics card output channels (described below) inside the workstations 38–50.

The *.ini file may contain as many as two hundred separate parameter adjustments, and an even greater number of specifications of parameters pertaining to the animation. The *.ini file on any one imaging computer will differ from the *.ini file on any other imaging computer in its assignment of station ID and node ID. In the illustrated embodiment, each imaging computer controls four stations or virtual cameras. Each imaging computer will also be assigned a unique node number. The *.ini file further contains a bit which tells the system whether the imaging computer in question is a render server or not. The imaging computer uses the station ID contained in the *.ini file to determine which of the several virtual cameras or viewpoints it should use; to minimize network traffic the parameters for all of the virtual cameras for all of the viewpoints are stored on each imaging computer hard drive.

As loaded and executing on one of the general-purpose processors of the imaging computer, the *.cfg file responds to commands from the *.ini file. The *.cfg file is an artwork developer's tool for configuring specific sequences of preloaded art material to behave in certain ways. The *.cfg file responds directly to the textures and geometries which the art developer has established for the animation sequences, and has a direct association with all textures and geometries that are stored on all mass storage media in the system. The *.cfg file controls how the animation progresses; it contains calls to portions of the rendering sequence, such as layerings, timings of certain sequences and motions of specific objects found in the texture and geometry files. The *.cfg file either contains or points to all of the information that any rendering client or server would need to handle its portion of the full rendering of the entire multi-channel array. For any one contiguous display, the *.cfg files distributed to the imaging computers controlling the individual display panels will be identical to each other, but the information and calls therein are accessed and interpreted differently from one computer to the next according to whether the computer has been identified in the *.ini file as a render server or not, the node ID of the imaging computer, and the station IDS controlled by that imaging computer. The *.cfg file also contains command lines used to make an interrupt, as when the system administrator wishes to change the animation or other scene elements during runtime.

All of the software components shown in FIG. 14 are written to the hard drives of the imaging computers prior to execution of the animation sequences. This greatly decreases the amount of required network traffic.

Each of the rendering servers and clients has stored thereon a world scene 556 or a replica 558, 560 thereof. These world scenes are constructed using a library of graphical imaging data files (in this embodiment, partitioned into geometry and texture files) 562, 564 and 566 stored on the hard drives. The render server 38 further has foreground, background, viewpoint generation and sequencing algorithms 568 which it accesses to set the viewpoints. Algorithms 568 together make up an overall system monitoring protocol which permits the system administrator to manually review or intervene in making on-line changes and adjustments to any viewpoint already established on the system.

Also present on all rendering computers (servers and clients) is an executable (*.exe) file which, when executed by any imaging computer's processor, interprets data stream commands coming from the rendering server and received by each of the clients. The render server 38 further keeps a clock 570 that is used to synchronize the animation across all of the displays.

Figure 2:
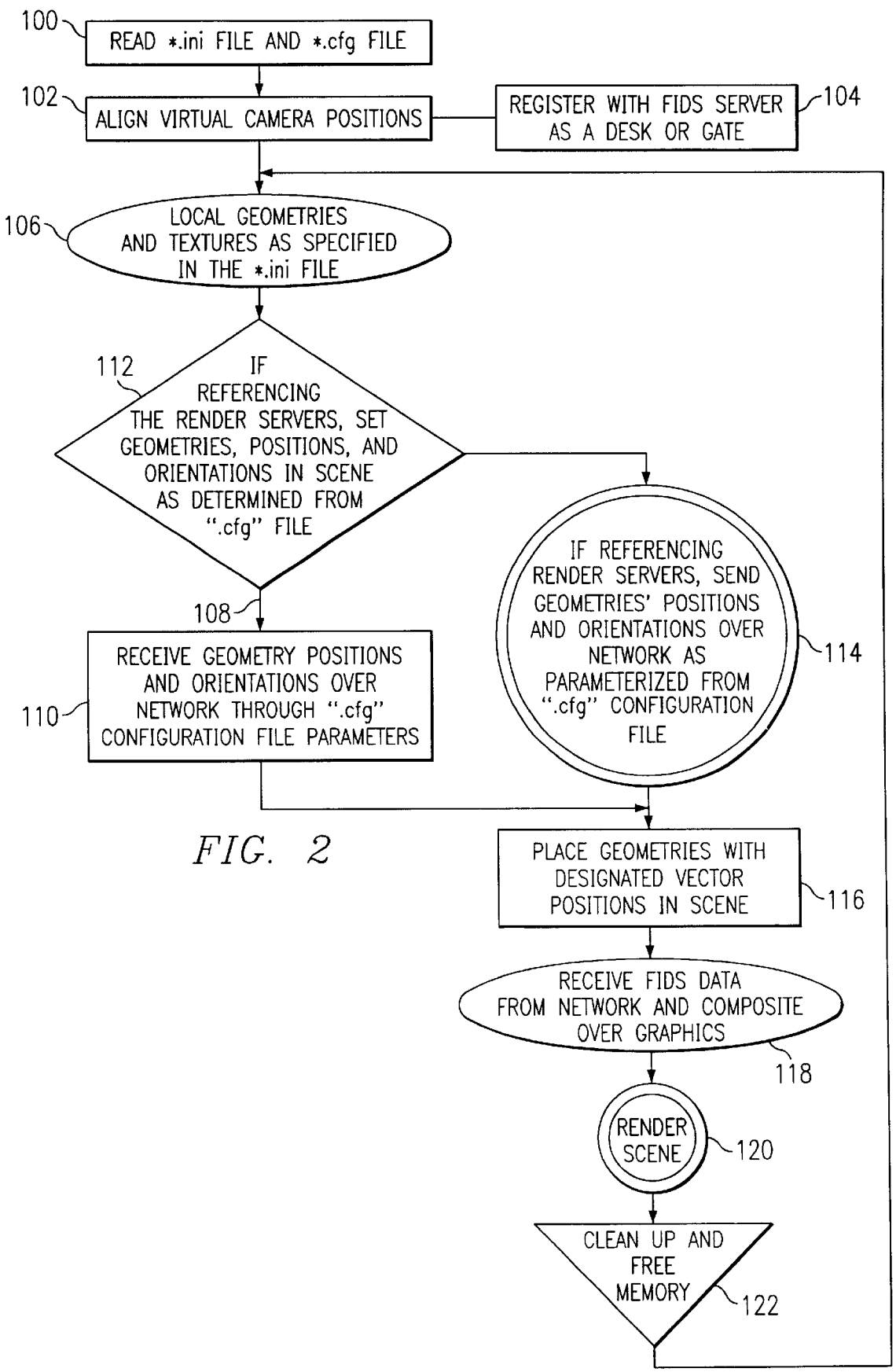
FIG. 2 is a high level schematic block diagram of a virtual camera establishment, animation and imaging process according to the invention.

FIG. 2 is a block diagram illustrating the high-level operation of the imaging computers according to the invention. A typical application of the invention, the system 10 as shown in FIG. 1 is used to provide an array of multiple, contiguous displays for the projection of a unified video image containing animation characteristics and overlaid text. In FIG. 2 at step 100, and for each rendering server 38, 44, 48, the *.ini file and the companion *.cfg file are loaded from the mass storage media associated with respective ones of the imaging computers to RAM. The illustrated embodiment uses, at each imaging computer, one or more general-purpose processors that are programmed to carry out the invention with computer programs that are loaded and executed; it is also possible to hard-wire many of the listed functions and to use special-purpose processors.

At process step 102, "virtual cameras" are created by the render server viewpoint algorithm which correspond to each of the output video channels. These "virtual cameras" are logical partitions of the processors and memories of imaging computers 38–50, four such virtual cameras being created for each imaging computer 38–50 in the illustrated embodiment. The system administrator sets up the properties of these virtual cameras in the software in advance of execution. The "align cameras" process 102 begins selecting previously stored imaging textures and geometries so as to lead to the creation of the final set of images. Camera alignment step 102 is linked to a step 104, which in the illustrated airport terminal embodiment establishes each of these virtual cameras as driving a display for either a desk or as a gate. Process step 104 makes it possible to assign certain text data to each of the virtual camera nodes established at step 102. Registration with the FIDS server at step 104 also includes defining a prescribed set of locations for the overlay of the animation by these text data.

Step 102 establishes which prestored geometries and texture files are needed for a scene. Step 106 queries these files and loads them. A geometry file possesses information on the exterior limits of a displayed object. A texture file relates to a color/surface treatment of such an object or of the background. These geometries and textures are stored prior to runtime on the mass storage device(s) of each server and client, so that they don't have to be transmitted over the network.

At step 112, each rendering server or node 38, 44, 48 establishes a scene by compiling the previously loaded geometries and textures, setting their values in terms of displayed geometric positions and orientations within this newly created scene. As this operation is taking place, the results are sent (step 114) by each render server and are received (step 110) by each client 40–42, 46, 50. This data flow of vector positions and orientations, also known as sequencing instructions, across the network tells the imaging computers 38–50 (and the virtual cameras set up by them) how to direct their respective portions of the full scene's animation layout across any of the screens or displays of the composite video array. The novel approach of transmitting geometries and textures to clients/virtual camera nodes first, and compositing them later into scenes (step 116) using subsequently transmitted vector information, provides the technical advantage of greatly reducing the amount of information that has to flow across the network between the rendering servers 38, 44, 48 and their respective clients 40–42, 46, 50. After texture and geometry loading, the transmissions between the servers 38, 44, 48 and their respective clients 40–42, 46, 50 consist only of vector positions of the stored textures and geometries instead of transmitting very large graphical data sets generating by the rendering computers.

At step 116, which takes place in each of the client and server imaging computers, the positions and orientations are used to place the geometries within scenes. The placement step 116 uses a coordinate system previously established by the software. The geometries, positions and orientations may change or may be modified as rapidly as the rendering servers 38, 44, 48 and the client computers 40–42, 46, 50 can individually generate the subsequent set of rendered images, or as fast as the speed of the network in relaying new positions and coordinates to the referenced client computers to produce the full scene, whichever factor is more limiting.

Once the geometries pertaining to the animation are properly positioned at step 116, at step 118 the FIDS data accessed by the UNIX server 12 (which in turn is linked to the network via path 74, FIG. 1) are directed to the appropriate ones of the rendering servers 38, 44, 48 and composited over the animation graphics. In the illustrated embodiment, each output screen 52–58 along the video array shares a preset list of textual flight information. This flight information may be updated independently of the animation rendering process. After step 118, the rendered scene at step 120 is refreshed with the next set of geometries to be established with new orientation coordinates on the same textured scene as background with the FIDS data stream continuing to project flight information within the same pre-established locations.

At the termination of each of these cycles at a step 122, the texture memory is purged to replenish available space for new imaging data in the animation to be loaded. The process then reverts to step 106 for the next cycle.

FIG. 14 overlays the principal steps of this process on one server/client group 24 of the network. At step 572, an executable file initiates data stream commands to begin the image rendering process. These commands are passed by the UNIX server 12 to each of the clients 40, 42, at which an executable file 574 receives the commands or cues and begins to construct viewpoint map images based on them. The images to be displayed are rendered by each of the clients at steps 576. When these images are completed, each client 40, 42 sends back a synchronization return signal 578 through server 12 to render server 38. Render server 38 waits until all such synchronization signals have been collected before initiating the next cycle in the animation.

Figure 5:
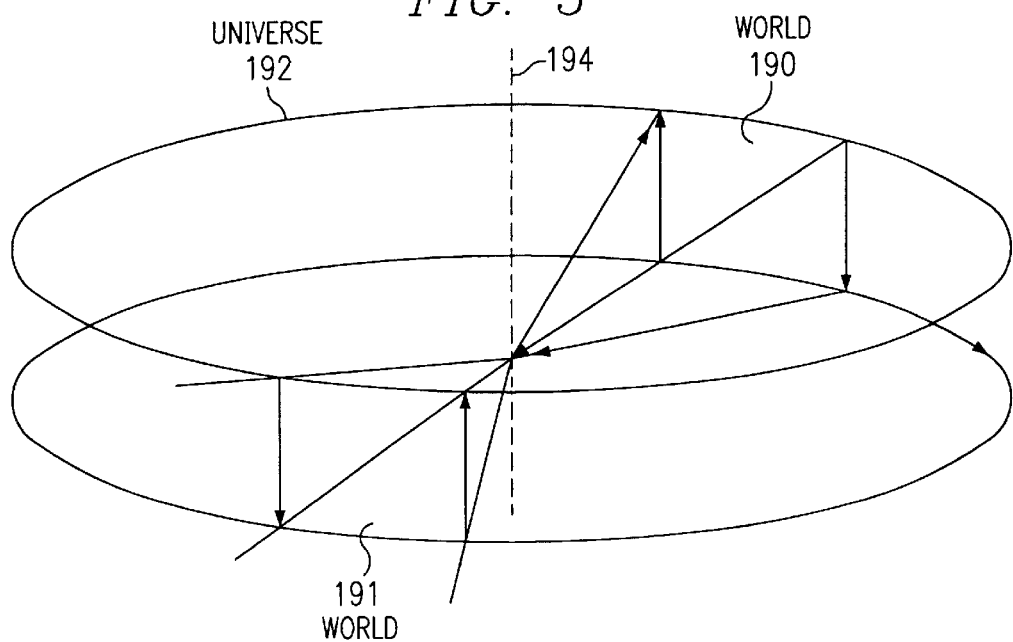
FIG. 5 is a schematic diagram of the "world" and "universe" concepts as used in the invention.

FIG. 3 is a flow diagram showing how a user selects viewpoints for each of the virtual cameras he or she wishes to set up in the multiple display system. A viewpoint defines a position and an orientation from which all of the geometries associated with the displayed animation imagery are rendered and projected onto one of the displays 52–58. Each "world", as that term is defined herein, has at least one viewpoint associated with it, and more typically multiple viewpoints, and it is from these viewpoints that scenes associated with the respective virtual camera windows are drawn. As shown in FIG. 5, worlds 190, 191 are defined as subsets of a universe 192 that is created by the user. When a universe is created in the software, a single virtual camera window viewpoint is automatically assigned to it. Once it is established, the user is permitted to construct additional virtual cameras each having possibly different viewpoints, and further has the ability to switch among them. A world in this sense comprises a set of viewpoints limited to a sector of the defined universe, with additional worlds within the same universe either existing adjacent to one another, partially overlapping, or as FIG. 5 illustrates, on opposite sides of the universe. Multiple universes may also be established with additional worlds as separate subsets to those designated universes, and these universes may reside on separate rendering servers. One example is the embodiment shown in FIG. 13. A predetermined conversion process may be used among worlds (for example, a separate world can be instantiated by each of separate server groups 508, 510, 514) to transfer geometry and texture positions and orientations among them.

Within any world, a scene may be rendered from several different viewpoints, each of which is associated with a particular virtual camera. Each virtual camera is associated with a scene graph. In some instances, the same scene graph may be shared between or among several virtual cameras, where their perspective views intersect. If, for example, two different rows of virtual cameras cross each other at some intersection point, then only those two overlapping virtual cameras might end up sharing a particular scene graph since they share the same viewpoint perspective field. Virtual camera windows depicting different scenes would use different scene graphs. In this manner, the viewpoint is determined before the scene is rendered.

At step 150 in FIG. 3, the user (system administrator) writes the position coordinates for the origin of a viewpoint. Once this is done, at step 152 the user determines the orientation parameters (see FIG. 4) associated with the viewpoint.

Next, at step 154, a corresponding identity matrix for the scene graph is enabled. Position and orientation are parameterizations within an X, Y and Z coordinate system which defines the identity matrix. In FIG. 4, this coordinate system 170 is illustrated with the X axis pointing to the right, the Y axis pointing straight down and the Z axis pointing straight ahead (into the paper). These coordinate frame axes, at step 156 (FIG. 3), are highlighted to the user on an administrative display screen such as monitor 64 in FIG. 1. The user then chooses an aspect ratio adjustment, which is a vertical scale factor applied to the screen image. This value is useful in correcting for any monitor or pixel distortions in the display system.

Figure 13:
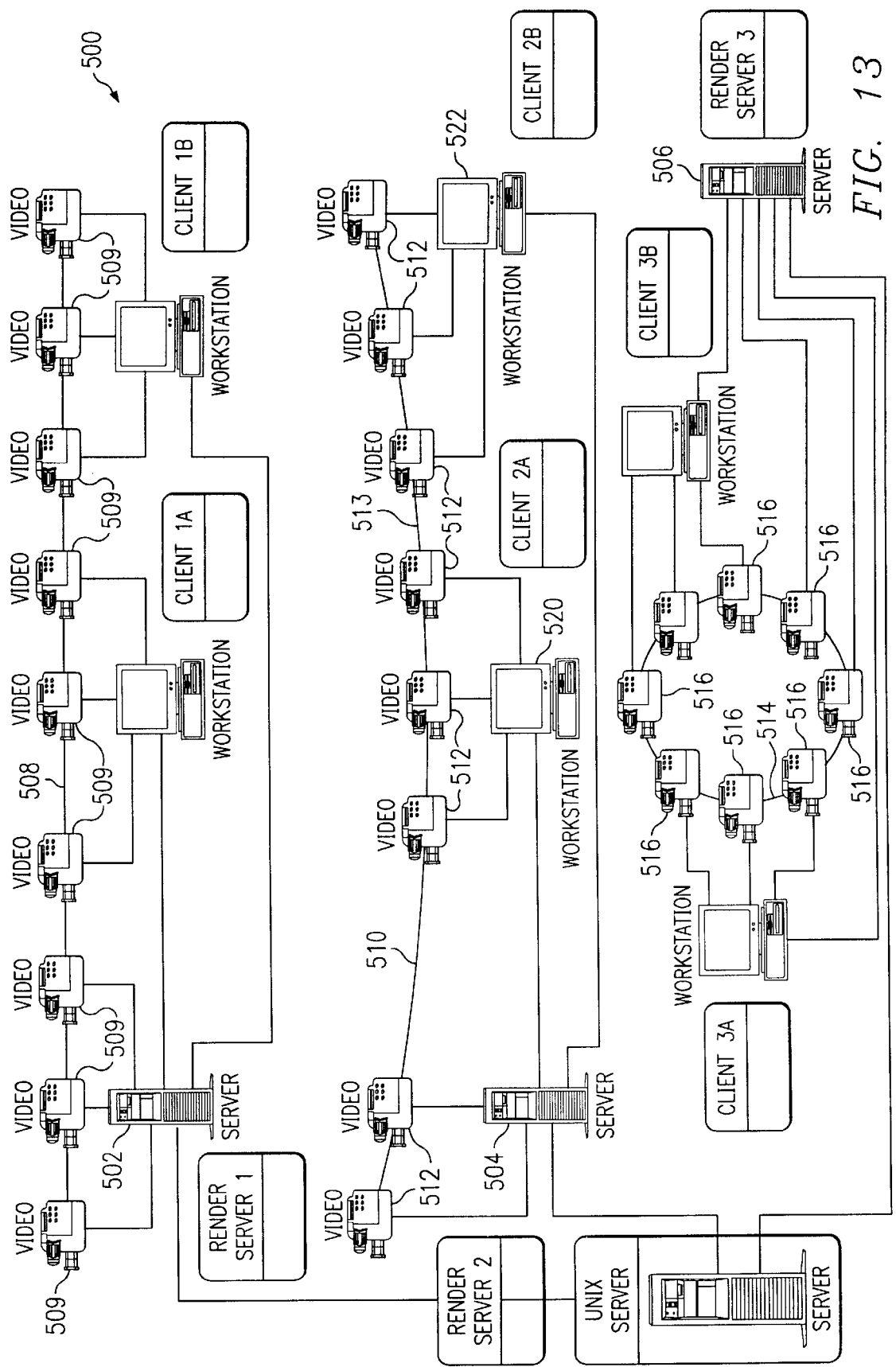
FIG. 13 is a multiple-display imaging array according to a fourth embodiment of the invention, illustrating different virtual camera position arrays.

At step 158 parallax settings are selected. The parallax settings may be used to establish a separation distance between virtual cameras along a linear path that is virtually spaced from the scene being rendered. This shape of this path is arbitrary. The path may be curved or straight; FIG. 13 shows examples of straight, curved and closed or endless paths 508, 510, 514 along which virtual cameras 509, 512, 516 have been distributed.

In many cases, a convergence angle may be desired among the virtual cameras on the path, depending on the type of scene selected, and this convergence angle is supplied at step 160. For example, when a scene is being rendered in multiple displays, it may be desirable for the viewpoint established in the scene to vary from one display to the next as an observer walks along the displays on a path parallel to them. The establishment of a convergence angle provides for a balanced and smooth proportional viewing of a scene and the matching of infinity point perspective from one display to the next. At step 162, after all of these coordinates and parameters have been selected by the user, the viewpoint of the scene is created and stored in the virtual camera memory and is available at runtime for the rendering and projection of the image.

FIG. 4 is a schematic representation of a viewpoint coordinate system and the world coordinate system upon which it is based. The world coordinate frame axes are shown at 170. The viewpoint coordinate frame axes are shown at 172, and as shown will typically be different from the world coordinate frame axes for the second and subsequent virtual camera viewpoints established for that world. The viewpoint coordinate frame axes establish the direction of the viewpoint. A hither clipping plane 174 outlines the limits of the viewpoint angle of view as it projects outward toward a view plane 176. By making adjustment to a hither distance 176 which is the distance between the view position 178 and the hither clipping plane 174, the size of the view plane 176 can be regulated, and therefore the range of the viewpoint itself. In this fashion, the view position and orientation can be established relative to the global world coordinate frame 170. Although in the example given in FIG. 4 the Y axis of the viewpoint frame 172 and the world coordinate frame 170 happen to be parallel, this need not be the case.

FIG. 5 illustrates the spatial relationship between two representative world localities 190 and 191 as they are situated graphically within a defined universe 192. The worlds 190 and 191 are subsets of universe 192, and several such worlds may overlap or exist oppositely within the same universe. A virtual camera object always corresponds to a region of the screen in which a particular view of the graphical universe is displayed. With the virtual camera structure of the invention, multiple views can be displayed simultaneously and flexibly to different parts of the screen. For example, a set of virtual camera windows can be assigned to a given world, which is itself confined to a specific region 190 of the universe 192 with viewpoints only defined for that particular world 190. At the same time, another set of virtual camera windows can be directly associated with another separate region 191 of the same universe 192, limiting those particular viewpoints to that individual world.

In FIG. 5, a central axis 194 serves at the point of origin directed toward each individual world, spread out 360° around the center of that universe 192. Each world may be defined as its own sector of that universe, and may be accessed as such. This attribute becomes necessary and useful in displaying concurrent multiple worlds within the same universe, or even in the multiple display of multiple universes, which can be achieved by using several rendering servers and their corresponding client computers.

For example, and as laid out in FIG. 5, a first rendering server and related group of clients can have loaded onto them the same universe information database as a second rendering server and its related group of clients. The displayed outputs of each server can be directed to opposite poles 190, 191 of the universe 192. Since the two rendering servers may be joined on a network, positional data relating to imaged objects may be exchanged between them thereby allowing for two separate worlds to coexist within the same networked system. It is also possible to have two separate universes running on two separate rendering servers, also linked within the same system, and visible on adjoining sets of output screens or displays, with data positions transferring between the rendering servers using a predetermined conversion process.

Figure 6:
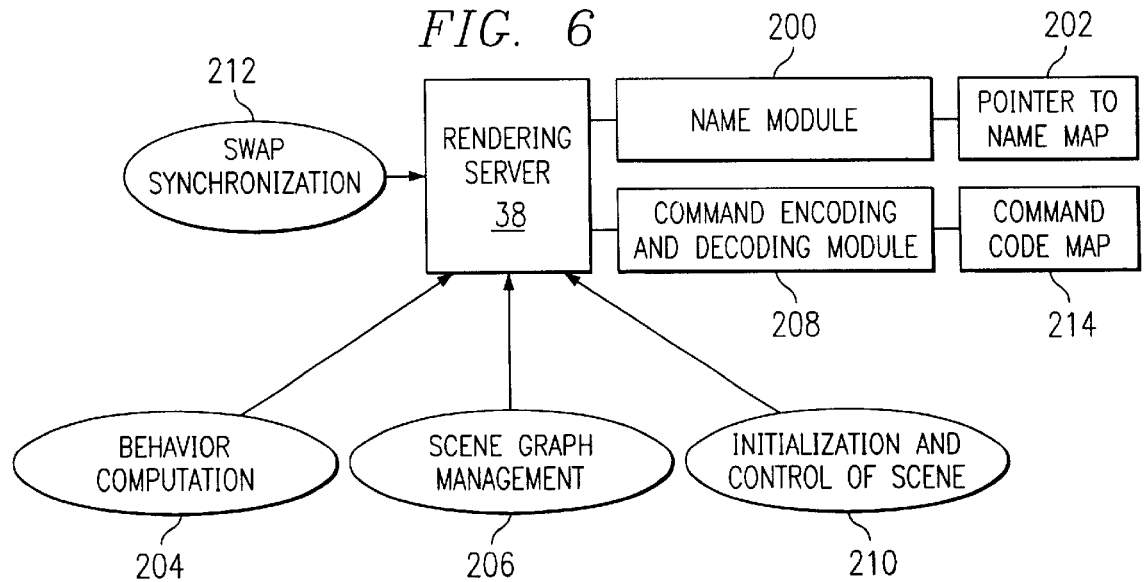
FIG. 6 is a block diagram showing modules of the image rendering process and system according to the invention.

FIG. 6 is a schematic flow diagram showing the rendering process within each rendering server. A rendering server, such as server 38 (FIG. 1), within a multiple-channel imaging array 24, handles all of the user interaction devices open to it. The rendering server 38 provides the framework under which the software protocols distribute real time animation commands across multiple channels to its clients 40–42. The rendering server 38 uses a communication protocol that provides a unique pathway through the system, which in turn enables the assignment of specific viewpoints of a given scene to respective graphics card video outputs along the array, and provides a method of synchronizing the whole array. The rendering server 38 controls the animation simulation to be displayed. The clients 40–42 are slaves to the server 38 and execute the commands addressed to them.

The clients and server(s) communicate using an application level protocol. Server-shortened command stubs are provided as a way to map the software animation application programming interface (API) calls to their distributed equivalents. Reciprocally, the clients' API or stub procedures provide a way to map commands received by the servers over the network to local software API calls. Copies of the APIs reside both on the rendering servers 38, 44, 48 and their respective clients 40–42, 46 and 50. Both the server and the matching client(s) maintain a copy of the current scene graph, which may be edited remotely through the network, and each scene graph is identical across each server group (e.g., group 24 FIG. 1) in the animation simulation.

A naming scheme or module 200 allows the client and the server to which the client is connected to address remote objects within the scene graph and to specify operations to be performed on them. The name module 200 is linked to a pointer to a name map at 202.

In the communication protocol, both the client and the server use calls to the software's network functions to connect to a multicast group. For example, the rendering server 38 issues commands to its multicast group 24. The application level protocol uses a net item syntax that is included within the animation software. In the actual transmission of information between any of the clients 40–42 and the server 38, a timing interval referenced as a type field is used to distinguish data items from command items. In the illustrated embodiment, the command items are distinguished from the data items by the most significant four bits of the type field, which are all ones. Type values 0XF0 to 0XFF are reserved for command codes.

The server loads a terrain model and computes the behavior at 204 for the activity taking place within the terrain. It initiates changes to the scene graph at 206 by making software calls to the client stub procedures. It may also make use of the naming module 200 to name objects in the scene graph. The rendering server 38 may also use a command encoding/decoding module 208 to process items addressed to it by respective clients, or by commands delivered to it from outside the network to re-edit or recompile an updated set of scene graph features at 206. The server 38 initializes and controls the scene at 210.

Rendering server 38 is responsible for initializing the animation simulation at 204 and also manages swap synchronization at 212 of all client computers linked with it.

The main role of the associated clients 40–42 (and similar logic within server 38 itself) is to render the scene from the respective viewpoints of the virtual camera objects that have been created in them, which have been adjusted for their respective viewing pyramids (see FIG. 4) and their respective orientations with respect to a perpendicular plane. As explained in conjunction with FIGS. 2 and 14, the clients read their configurations from a text file referred to as an "*.ini" file. Following this, each client regularly decodes packets of data sent over the network and executes software calls locally on its copy of the scene graph. It uses its copy of the command encoding/decoding module 208 to map, at 214, the command code to its appropriate procedure. This map 214 is set up statically and all clients 40–42 rendering under the designated server 38 must have a copy of this map before the simulation can begin. The clients use their copies of the naming module 200 to resolve client references at 202 to objects in the overall scene graph.

Figure 7A:
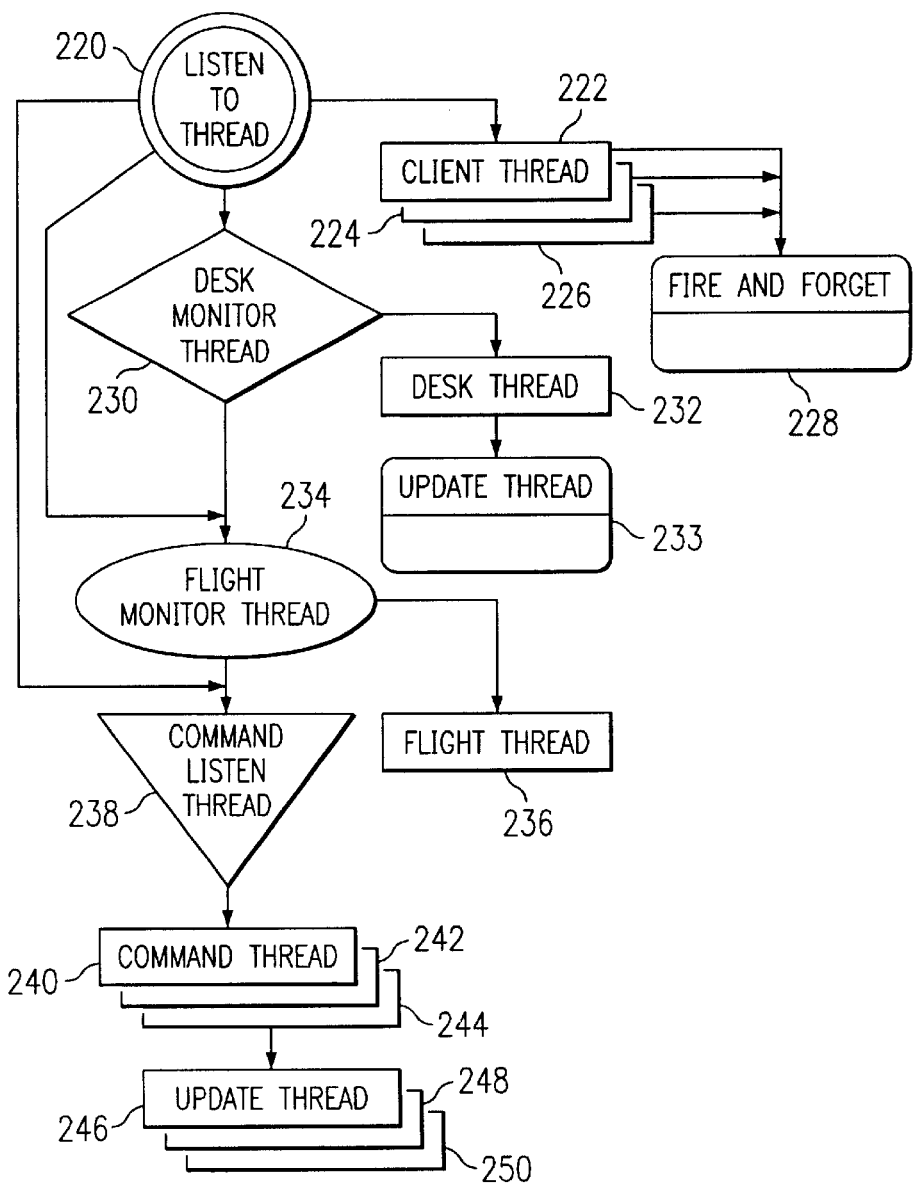
FIG. 7a is a schematic block diagram showing the integration of text data into displayed images by a rendering server according to the invention.
Figure 7B:
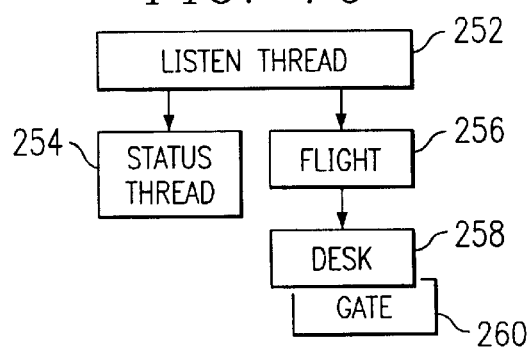

FIGS. 7a and 7b illustrate how text information may be overlaid on the image displays. In the illustrated embodiment, FIDS data, which is Oracle based and exists within a UNIX platform environment, may be obtained through an Ethernet connection outside of the rendering server and client network and then integrated into the animation process. In the illustrated embodiment, the flight information derived from the FIDS database is available in airports throughout the United States and in other countries throughout the world and provides arrival and departure information for passengers traveling by air. Displays carrying the FIDS information are situated in flight desk areas and gate areas for specific airlines.

In the software protocol shown in FIG. 7a, a listening thread 220 is initiated that queries the incoming FIDS data received by the system. The system results are then transferred to a set of client threads 222, 224, 226 (a representative three of which are shown) which analyze the information and begin the operation of parsing the data and organizing it into data groups to be routed to the appropriate scenes within the video wall established by the imaging system. A fire and forget protocol 228 is generated, completing the sectioning of the data, and then detaching and resetting itself for further queries.

When the listening thread 220 detects a parcel of flight data in response to a preloaded data query, it delivers a sequential set of commands to a desk monitor thread 230, a flight monitor thread 234 and a command listen thread 238. Threads 230, 234 and 238 each activate in response to receiving these commands and route appropriate information to either a desk or a gate.

The desk monitor thread 230 selects which desks are to receive which sets of flight arrival and departure information; different ones of these information sets pertain to particular desks. For each desk, a desk thread 232 is updated (233) by the system. Flight monitor thread 234 completes a process of determining a flight thread 236. Once this occurs, the command listen thread 238 acknowledges the arrival of all of the data, which is now fully parsed. The command listen thread 238 issues commands as to how the text is to be allocated within the video array as well as into the independent gates within the terminal, switching a set of command threads 240, 242, 244 (a representative three of which are shown) to complete this stage of the process. Command threads 240–244 are "fire and forget" operations, which engage and then detach, logging a respective update thread 246, 248 or 250 as they finish.

FIG. 7a illustrates operations taking place on the UNIX server 12 side of the system. On the client side (taking place within any of the imaging computers 38–50; rendering servers 38, 44, 48 are also "clients" for the purpose of FIDS data distribution and imaging functions), shown in FIG. 7b, a new listen thread 252 is engaged responsive to a command addressed particularly to that client by main server 12, and prepares itself to receive the text portion of the FEDS data, including flights 256 for both desks 258 and gates 260. As the rendering servers and clients integrate the text information for the screens controlled by them, a status thread 254 checks and logs the completion of the operation, and resets itself for the next series of queried FIDS data. The frequency of the querying is adjustable by the user of the system. If flight data are not present by a certain preset time, the controlled screen does not display the new flight data until the occurrence of both a new timing period and the arrival of new flight data. The user may monitor the system remotely through telneting to the UNIX server 12 or through software loaded onto the server 12 that reveals the complete graphics of each of the video wall screens and gate display screens.

The illustrated embodiment is one form of overlaying text associated with animations displayed along large video walls with other adjacent screens that are located at gates within an airport environment. The present invention is also useful in situations where rapidly changing or time-variant text is closely integrated with large video walls having a multiplicity of screens where detailed animations, simulations and video overlays stretch along the full length of the video wall, and where such animations are to be monitored and modified remotely by the users via the Internet. The present invention has applications which include public municipal stations, malls, stadiums, museums, and scientific research laboratories and universities.

Figure 8:
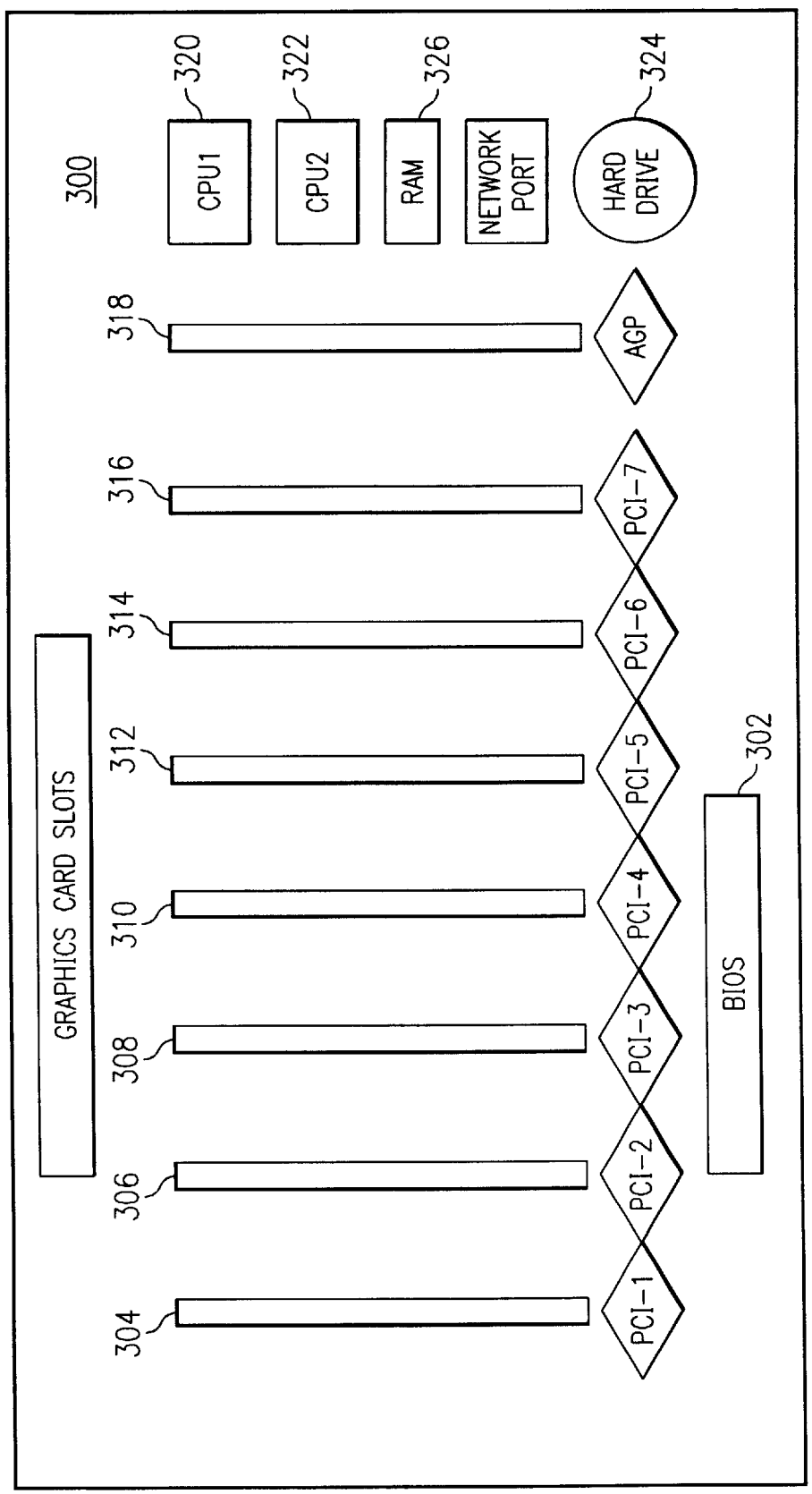
FIG. 8 is a schematic plan view of a graphics card and motherboard architecture according to one embodiment of the invention.

FIG. 8 illustrates a main motherboard assembly 300 that, in a preferred embodiment, exists in the all of the imaging computers 38–50. Each of these motherboards 300 may be identical for all computers operating in the network, or they may be of a different type or manufacturer, so long as the same motherboards are used within the same render server/client groups 24, 26 or 28. This feature allows for a differentiation of functions of different motherboards to be spread out across multiple rendering computers used throughout the system.

Each motherboard 300 must be equipped with a BIOS 302 which acknowledges the presence of multiple graphics cards 304–318 plugged into their specific slots. In the illustrated embodiment these include both 32-bit and 64-bit PCI slots 304–316, numbering up to seven slots per motherboard, and one AGP high speed slot 318. The BIOS 302 built onto the motherboard must be able to assign different memory addresses to each of the cards 304–318, enabling separate video driver information to be sent to this specific card through the PCI or AGP bus (not shown), in turn allowing for video output information data to be allocated to that card. Once this is achieved, the imaging system can detect each card and direct each respective virtual camera windowing aperture frame to the VGA output of that card. Different video cards and their manufacturers have differing means of assigning these addresses for their respective video drivers under this arrangement, requiring that all video cards loaded onto the motherboard 300 in a multiple array be of the same type. The customization of the video drivers for this imaging system array and its software controls allows for different video card types to share the same motherboard under the operating systems of Windows NT 4.0 and Windows 2000, if the motherboard chosen to be used has a BIOS 302 that can acknowledge all the separate cards and assign unique memory addresses for those cards.

Figure 9A:
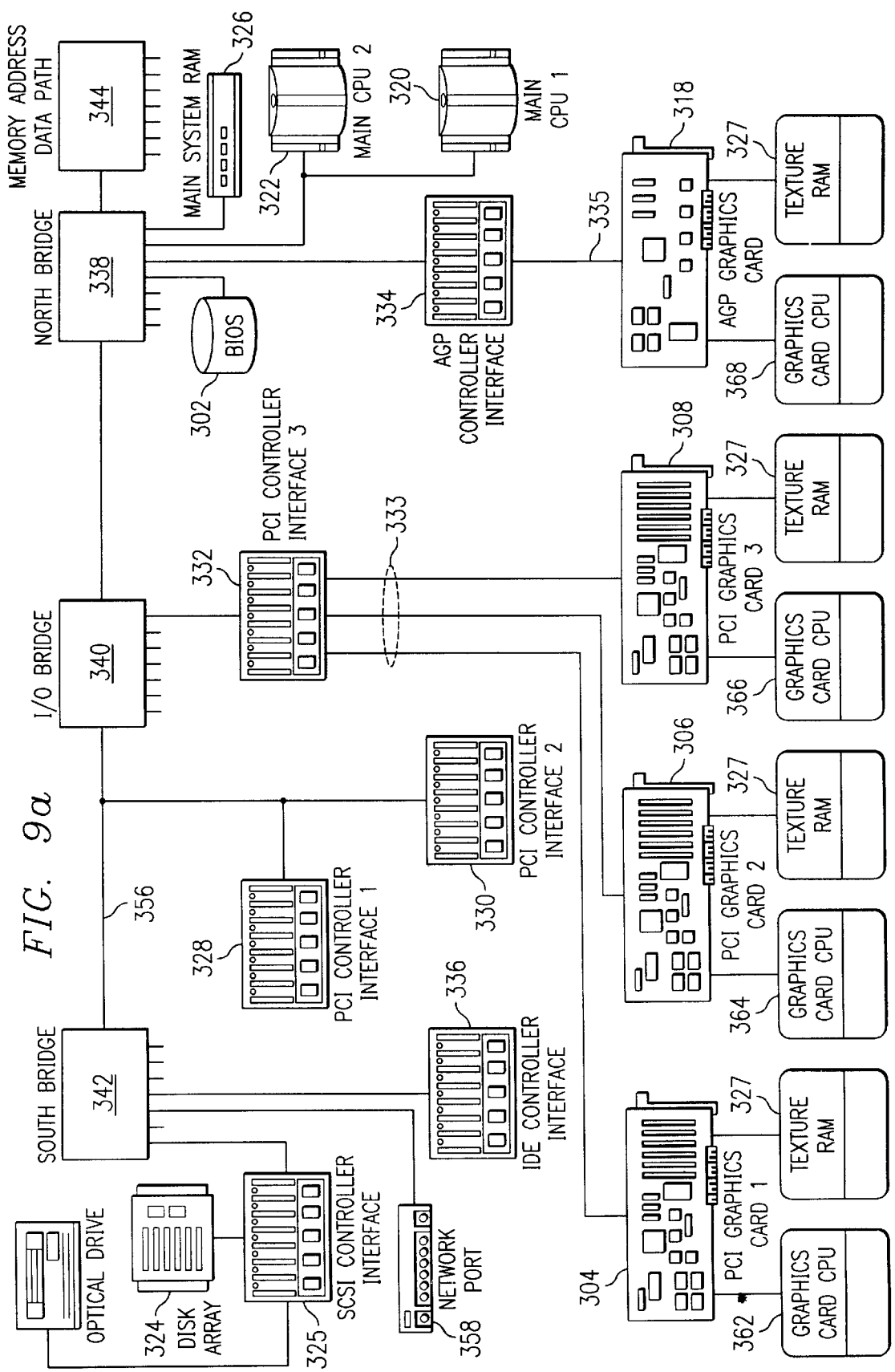
FIG. 9a is a schematic diagram of a preferred hardware configuration of a rendering server according to the invention.

In a preferred hardware configuration, an AGP card 318 with one VGA output port can share the same motherboard with at least three PCI cards 304–308 of the same type, providing a total of four video output channels on that motherboard 300. This is a typical arrangement for all the rendering servers and their client counterparts with the multiple channel imaging software being used. Each video output then occupies the same resolution value and color depth for that computer, which can be modified independently on each video channel. Using dual or even quad CPU processors 320, 322 (a representative two of which are shown) on motherboard 300 maximizes the graphical computational speed delivered through the AGP and PCI buses to the graphics cards to enhance the speed of the rendering animation. Since the textures and geometries of the animation sequence reside on all of the hard drives 324 existing on their designated computers, the speed of accessing those libraries is maximized through the motherboard's own SCSI or fiber channel buses 325 (FIG. 9a). Further, each motherboard 300 contains sufficient RAM 326 to transfer the graphical data, interacting with the cards' own video drivers and the available texture RAM 327 on each of the video cards 304–318. The addition of two or even four video output ports on the AGP cards 318 will increase the data throughput to an even greater level, due to the existence of more on-board AGP graphics card pipelines provided by the manufacturers, passing data more quickly through the faster AGP bus to the rest of the motherboard 300. This configuration can also use multiport AGP cards 318 with multiport PCI cards 304–316 on the same motherboard to increase the number of channels per computer, provided that BIOS 302 can recognize each of the video addresses for each of the video ports. The software created for this imaging system array assists in this process.

Choosing the number of video cards per motherboard 300 must also take into account the most efficient use of available CPU speed on the board 300, the speed of the onboard network, and the presence of other cards running in the system. The addition of video frame grabber cards (not shown) on the motherboard 300 concurrently allows for live outside video to be introduced to the outputted animation video as nondestructive overlays, and may be routed along the video array at a desired degree of resolution.

FIG. 9a is a more detailed view of each of the rendering server and client architectures. Each of the motherboards in these computers contains CPUs 320 and 322, main system RAM 326, and PCI and AGP bus controller interface circuits 328, 330, 332, 334 and their associated buses 333, 335 (the buses for the first two PCI interface circuits 328, 330 not being shown). IDE and SCSI controller interface circuits 336, 325 are provided for "legacy" devices. Central, main chipset components 338–344 regulate the speed and bandwidth of data transferred between all devices connected to the motherboard, and provide the main conduit pathways for communication between these devices. The north bridge 338 serves as a main conduit for signals passing between devices in the central processing portion of the motherboard, including the CPUs 320, 322, RAM 326 and cache memory devices (not shown). The north bridge also connects to the AGP bus controller 334 the memory address data path device 344, which provides an optimized interleaving memory function for the system RAM 326, and the I/O bridge intermediate chip 340. The AGP port controller 334 is therefore permitted direct computational contact with the CPUs 320, 322 at preset, high front-side bus speeds set by the system BIOS 302 (such as 400 MHz), which is also connected to the north bridge 338, as well as the RAM 326, thereby giving it at least four times the speed of the other, PCI buses used to interconnect to the PCI graphics cards 304, 306, 308.

A primary PCI bus controller 332 is joined directly to the I/O bridge 340 and serves as the maximum throughput device for the PCI cards 304, 306, 308 connected to the motherboard, in the illustrated embodiment operating at 66 MHz. The other PCI controller interfaces 328, 330 are attached at a juncture 356 between I/O bridge 340 and south bridge 342, and in the illustrated embodiment run at secondary, lower speeds of 33 MHz. It is preferred that the PCI graphics cards 304, 306, 308 or their equivalents communicate at bus speeds of at least 66 MHz to the rest of the system.

South bridge 342 joins all "legacy" devices such as SCSI controllers (one shown at 325), IDE controllers (one shown at 336), onboard networks and USB ports (not shown). It also connects to network port 358, from which is transferred positional coordinates of an animation's formatted graphics. South bridge 342 is meant to attach to lower-speed, data storage devices including the disk array 324 from which source data for the system is derived. The architecture shown in FIG. 9a has been demonstrated to be superior in motherboard performance in terms of data transfer speeds and bandwidth capability for multiple graphics card intercommunication on the motherboard and is preferred.

Each of the graphics cards 304–318 has a respective graphics card CPU or processor 362, 364, 366 or 368. The "processor" or processing function of the invention is therefore, in the illustrated embodiment, made up by CPUs 320, 322, and 362–368. The graphics processors 362–368 complete the image rendering processes started by general-purpose processors 320 and 322. General-purpose processors 320 and 322 also handle all of the nonrendering tasks required by the invention.

FIG. 9b shows how the operation of the motherboard results in total output resolution. Each successive graphics card present on its respective bus communicates to the BIOS its slot numbered position at step 350, thereby directing the BIOS 302 on how to address the video driver to handle multiple output video channels, selecting a numerical value as to the number of channels available. At 352 the user may manually select the final resolution of each video output on each video card, which at 354 sets the overall resolution of the entire video animation image emanating from that particular computer box. The total resolution of the video wall made up of these contiguous video channels arranged and positioned precisely together is a summation of each of the resolutions set by each channel on each graphics card, including all multi port channels wherever they might be available on their respective cards.

It is also useful to consider the ability of the motherboard, its drivers, and its BIOS to perform these tasks within other operating systems such as LINUX, running on separate rendering servers and client computer systems in a manner that is more efficient in the retrieving and compiling of the graphical data. This may also be a determining factor in the methodology of accessing the fullest computational time usage of the multiple CPU processors on the motherboards in terms of multithreading of the animation rendering software integrated within the functions of the graphics chart cards chosen for the system.

Figure 10:
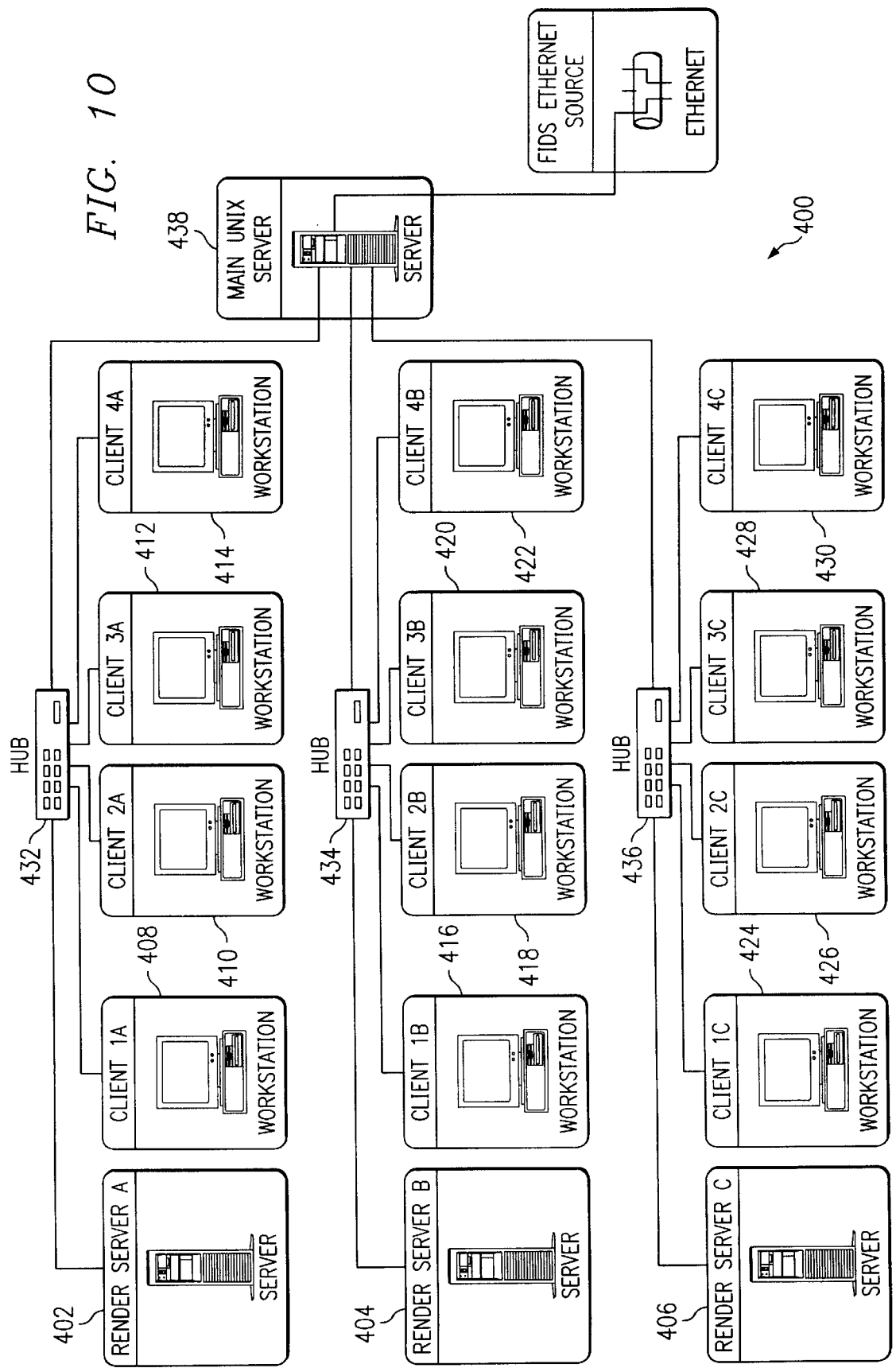
FIG. 10 is a high-level schematic diagram of a server/client network according to a second embodiment of the invention.

FIG. 10 shows an alternative system 400 in which a group of rendering servers 402, 404, 406 may be joined with their corresponding rendering client computers 408–414, 416-422 and 424–430 through a series of independent hubs 432,

434, 436, which link the clients with their respective servers. The hubs 432, 434, and 436 are themselves joined to a central UNIX-based server 438. FIG. 10 illustrates the modular nature of the system and how additional server rendering groups may be added onto the full system 400, increasing the number of total channels in a video wall animation.

The preferably UNIX-based main server 438 joining the hubs linked to the groups of rendering servers is the entry point for the introduction of the FIDS text data to be overlaid on the various animation screens of the multi-channel imaging system. A total of eight virtual camera windows may be provided for each of the rendering servers 402, 404, 406 and there is no upper limit to the number of rendering servers which can be brought into the system. The number of client computers 408–414 in each server group may number as high as eight, matching the number of separate virtual camera windows permitted within each server, or have no upper limit if repetition is required for establishing more operations taking place on these separate client computers that distinguish them from the first group. Situations where this might arise would be in the creation of a backup of the system, the introduction of additional universes running on separate rendering servers simultaneously with nondestructive overlays presented on the first group, or where additional features are implemented specifically on certain client boxes. Each rendering server 402–406 may be identified with one particular world, or it may function to elaborate upon that same world with an additional set of virtual camera windows set up on another rendering server with its own set of new clients. The hardware used with each client and its respective server must be the same for purposes of symmetry in computing of the final video image, but different sets of hardware, including graphics cards, drivers and motherboards, may be used in each separate rendering server group.

In a standard contiguous video wall arrangement, each rendering server 402–406 provides a consecutive set of video channels that match precisely in a graphical sense as one views the video array from left to right, with the last image of the first group matching its right side with the left side of the first image from the second rendering server group, and so on. Under this arrangement, there is no upper limit to the length of the video wall, and the real-time animation rendering is regulated by the processing speed of each client computer box, the server computer boxes, and the network that joins them.

FIG. 11a shows an example of how a contiguous set of virtual camera viewpoints may look when projected onto a large video wall. Each of the video channels are numbered sequentially from left to right as channels 1, 2, 3 and 4. To create continuity, the right edge of image frame 1 maps precisely onto the left edge of image frame 2 at a boundary 450, and so on along the expanse of the video wall, with no upper limit as to the number of channels which may be added. The timing of the animation sequences within the scene graph is regulated such that objects that move out of one frame and into the adjacent frame left or right do so continuously without breaks or pauses.

Each rendering server and its adjoining client computer units make up contiguous portions of the video wall, which may be directed both horizontally or vertically, numbering from bottom to top for vertical video walls. A video wall constructed according to the system may have other shapes and directions, including cylindrical, domed, spherical, parabolic, rear or front screen projected configurations, and may include additional tiers of horizontal rows of video screens. This feature included within this multi-channel imaging system is enabled because the virtual camera windows the user selects to assign viewpoints to specific video card outputs are based upon a coordinate system that the user is able to define and control as a part of the viewpoint software, with the animation rendering portion of the software responding to those portions of worlds the user has established within each rendering server or client computer.

As shown in FIG. 11b, graphical overlays or superimpositions of other rows of real time animation are possible, since more than one viewpoint may be assigned to the same video output channel, and with one of the virtual camera window settings having a smaller aperture than the other, with those sets of smaller apertures extending across the video walls in a contiguous fashion. The source of this second superimposed viewpoint series may come from another region of the same world, or a separate world altogether.

Figure 12:
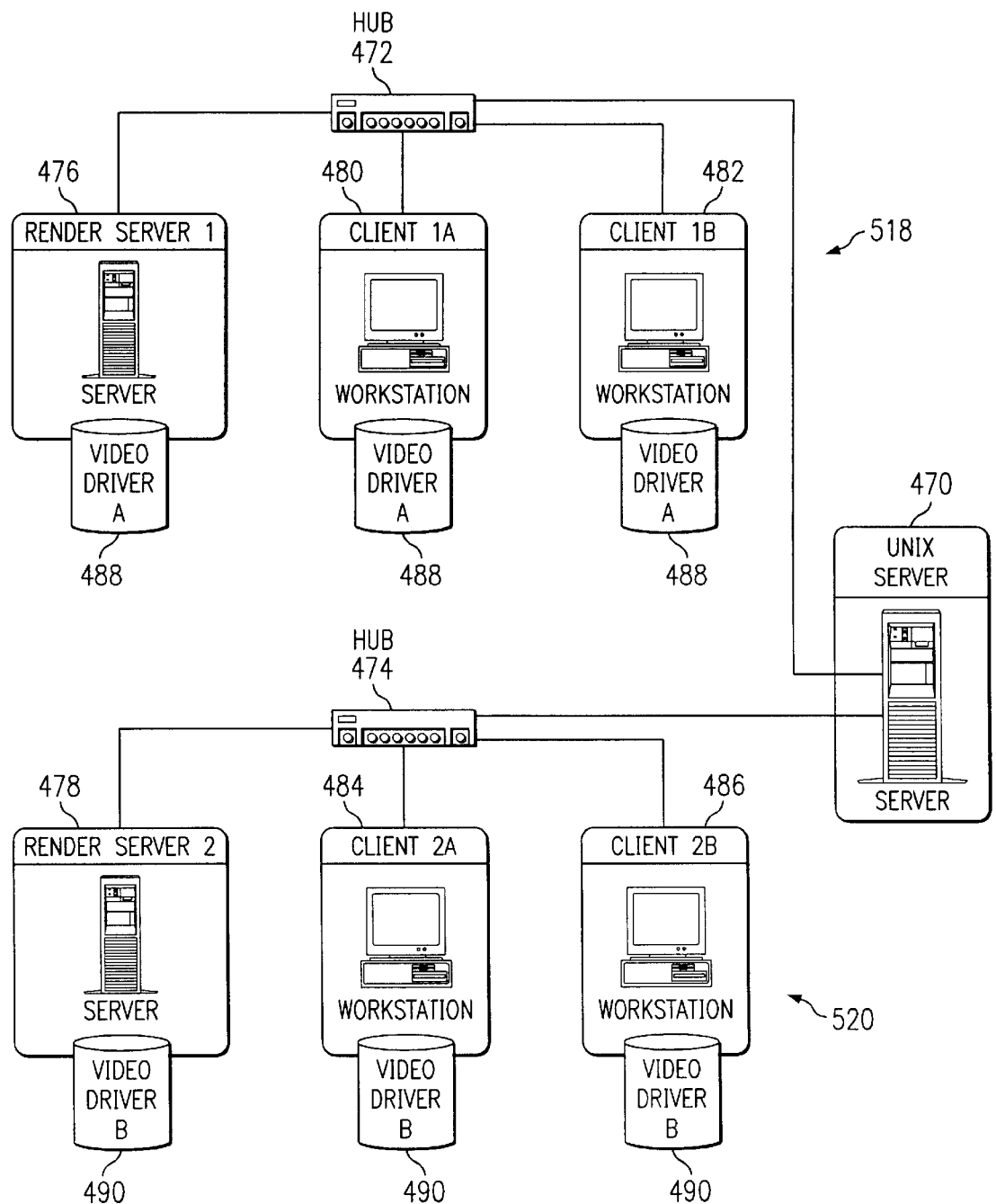
FIG. 12 is a high-level schematic diagram of a server/client network according to a third embodiment of the invention.

FIG. 12 shows how separate video drivers may be used simultaneously in the multi-channel imaging system connecting with same UNIX server 470 that links the data flow from the separate hubs 472, 474 that join the respective rendering servers 476, 478 and their respective client computers 480, 482 and 484, 486. In order to use separate video drivers and video cards within the same imaging array system, the graphics cards and their associated video drivers 488, 490 must be confined to their own groups of rendering servers and clients. Using multi graphics card types within the same system has the advantage of using one card's special features, such as processing speed and resolution, with those of another graphics card. Some graphics cards will have tremendously greater processing speed, anti-aliasing features, and greater texture memory, which are useful for certain types of video animation. The user can allocate these cards to worlds that are intricate in nature, requiring greater computational speed to display the animations. Other cards which are not quite as fast in terms of processing may be then designated for simpler animations, directed towards the other sets of screens in the video array installation.

All video drivers introduced into the system may be used to access worlds, but some worlds may be created to suit one video card's manner of displaying imagery through its own specific video driver. In addition to this, newer graphics cards that are recently introduced to the market may be loaded and tested against the existing video cards present on the system without having to rewrite software code for the entire system. By distinguishing and separating the newer cards' video driver from another set of video drivers already present within the system, a new set of differentiated tests may be implemented into the video array while the system remains continually online.

FIG. 13 shows a system having multiple camera base configurations running concurrently within the same network 500. Each base configuration uses a separate rendering server 502, 504 or 506, with associated client groups acting upon worlds whose geometry and texture data are accessed within that same network. A first camera base or array of virtual cameras 508 is "horizontal" in that the virtual cameras of it are equispaced along a virtual straight line and have viewpoint axes which are parallel to each other. A second camera base 510 takes the shape of an arc; its virtual cameras 512 have viewpoint axes which are not parallel but which rather converge. A third camera base 514 forms an endless loop with the viewpoint axes of its virtual cameras 516 outwardly directed.

In each camera base instance, the same worlds may be used, or separate worlds may be newly introduced. The parallax value in each base configuration 508, 510, 514 is chosen by the user, as well as the three-dimensional coordinate system parameters that describe the particular virtual camera base orientation responsible for capturing the viewpoints within a particular world. The "horizontal", linear based configuration 508 has a parallax value set as a virtual distance between each of the virtual cameras 509. On a separate rendering server 504 and its clients 520, 522, an arcing base 510 anchors convergent viewpoints whose coordinates the user may select in the software's parameters. Such curved camera bases are able to work with the convergence used in certain animations which encourage the viewer to focus more on activity and objects that exist in the foreground as opposed to the more distant background features, depending on the angles between the curving set of viewpoints. Also, within certain types of generated worlds, a linear horizontal base may not provide needed convergence but a curved virtual camera base will. The arcuate path 510 can be used, for example, in a set of displays arranged along a wall to simulate a set of windows in the wall to the outside. As the viewer moves along the wall, the viewpoint changes such that what the viewer is seeing mimics what he or she would see if those displays really were windows.

The circular virtual camera base 514 covers a full 360° sweep of an animated world. This camera base lends itself to more three dimensional applications of animation viewing, requiring the system to allocate geometries and textures around the entire perimeter of a world. An endless base 514 can be used to show portions of multiple worlds in larger detail. Arcing virtual camera bases like base 510 can be used in video projection for "caves" and other rounded enclosures, where the projected imagery surrounds the viewer or viewers in a theater type arrangement. In this instance, the three dimensional coordinate system that defines the viewpoints set by the user of this system determines the degree of arc of the projected imagery against a curved or sloping screen surface. Since the viewpoint controls within the software allow for both flat plane as well as curved surface structure, the nonlinear aspects of projecting against any curved surface may be programmed into the system to compensate for the curvature of the projection screen, even if that curved surface is discontinuous. The final image will be viewed as a transposition of a flat rectilinear scene onto a curved surface screen, without distortions or with reduced distortions, in either a rear projected or a front projected format. Consequently, the contiguous set of images along an arc may also be joined together seamlessly, in the same fashion as a set of contiguous flat images that are precisely matched along each other on a flat display screen.

While three representative virtual camera baselines or paths 508, 510, 514 have been shown, others are possible. The illustrated baselines are all within a single plane, but this need not be the case. For example, the viewpoints of contiguous displays could differ one from the next in elevation, such that, as a passer-by viewed these displays, he or she would perceive the same scene from an ever-higher viewpoint. Suppose that the displays were placed along a wall, and passers-by viewing the displays were walking up a ramp. The viewpoints of the displays could be selected such that the perceived change in viewpoint matched, or was a function of, the viewer's real change in elevation. Nor would the change in viewpoint from one virtual camera to the next have to be at a constant spacing; a set of viewpoints could be chosen such that the change in viewpoint from one virtual camera to the next could be accelerated or decelerated.

The software controls enable the user to set the shapes of the viewpoint windows themselves, thereby creating apertures that are rectangular, triangular, or keystoned, depending on the nature of the projection screen's shapes. Prior to the invention, the projection apparatus had to be fitted with special lenses and apertures on the projectors to create an undistorted balanced image on a curved screen. According to the invention, the networked set of rendering server and client computers all share the same programmed curvilinear settings for projecting each image on an elongated curved screen, and are not limited in number of terms of channels used in the full system. This feature provides the capability of increasing the resolution of the final projected image along the inside of the caved enclosure by increasing the number of channels per horizontal degree of view. The system further provides for the introduction of rows or tiers of curved images, vertically, which can be especially useful in the projection of images within large domes or spheres, or where imagery is seen both above and below the vantage point of the viewers. The use of superimposed projected imagery as illustrated in FIG. 11b may also be used in a curved screen surface environment. If different shapes of curved projected material are to be used simultaneously, the multi-channel networked imaging system can assist to allocate one set of images for one shape of screen, and another for another shape.

The modularity of the system as shown in FIG. 13 permits its adaptation to multiple cave or domed theater enclosures employing multiple sizes and shapes, with the same or different sets of subject matter to be projected. Multiple rendering servers may be employed simultaneously, each with separate sets of viewpoint windows tailored precisely for a certain enclosed screen's configuration, programmed for those rendering servers and their connected client computer boxes. This permits a uniquely differentiated set of worlds to be shown for different cave enclosures, where portions of cave enclosures at the same time, within the data set of a single universe or even linked for multiple universes that are joined together by the same UNIX server network.

In certain cases both front and rear projection may be chosen for an installation involving different cave enclosures, altering the manner in which images appear on the enclosed viewing screen. In such an embodiment a group of rendering servers and their client computers would be assigned for rear projection, and another separate group would be assigned to front projection imagery, each specifically addressing the nonlinearity corrections necessary for projecting onto curved surfaces. A single cave enclosure may provide both front and rear screen viewing zones simultaneously within the same chamber, as in the case of a sphere or dome inside a large spheroidal or domed theater enclosure. Within this structure, the outer spheroidal sets of screens may use front protection, joined with one group of rendering servers and their rendering clients, and an inner sphere or domed structure would make use of rear projection for another associated group of rendering servers and their own rendering clients.

As shown for example in FIG. 12, separate sets of differing graphics cards and their corresponding video drivers 488, 490 and functions may be applied and installed with separate groups 518, 520 of rendering servers and their designated client computers, where the application requires preferred types of graphical computation in each. If the data set is large for worlds and universes displayed within e.g. caved viewing theaters, the UNIX server 470 that joins the network of all rendering servers provides a high speed computational link that addresses the positions of the varying textures and geometries made visible in and around the enclosures. Since the real time animation rendering capacity is enabled on all servers and their rendering clients in this regard, increasing the output resolution per degree of arc for the projectors and other connected display devices used in this system is achieved by increasing the total number of video channels joined throughout the system, with no upper limit, to further enhance the makeup of the entire video projection array.

Figure 15:
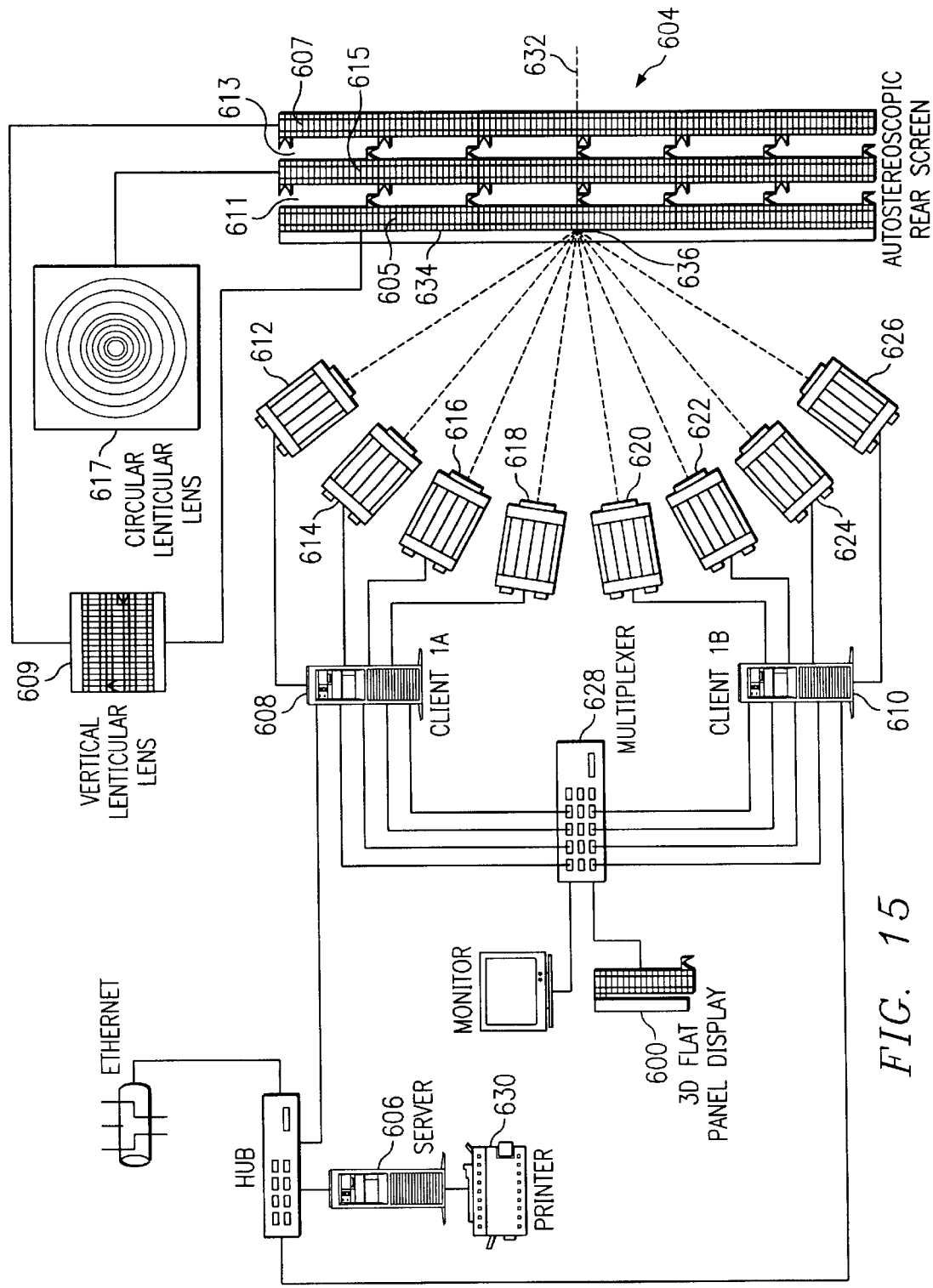
FIG. 15 is a high-level schematic block diagram of an autostereoscopic system employing the invention.

FIG. 15 illustrates two particular applications of the invention's multidisplay architecture: an autostereoscopic projection array and a flat panel display interface. The present invention has the ability to compile and project multiple perspective image viewpoints of a given scene simultaneously, which may be interfaced directly with various classes of newly developed autostereoscopic display devices such as flat panel 600 and rear projection screens 604. Such display devices free the viewer from the need of wearing shuttered or polarized glasses to view 3D stereoscopic images, greatly enhancing the wide angle viewing capabilities of autostereo images, and improving clarity and brightness of the final image set.

Since each rendering server 606 and its rendering clients 608, 610 (a representative two of which are shown) has established within it a software set of angled viewpoint controls assigned to video output ports, such ports may be used to supply images to angled projectors 612–626 that converge their output beams on a central point behind the autostereoscopic screen device 604. These screen devices are available from several manufacturers but their construction and operation may be summarized as follows. Screen device 604 is a rear projection system that includes two large rectangular lenticular lenses 605, 607 positioned one behind the other, on a central axis 632, with their vertical lenticules identical in spacing number such as 50 lines per inch. A front view detail of each of these lenticular lenses 605, 607 is shown at 609. The lenticules are arranged to be parallel to each other and are separated laterally by a fractional amount of a single lenticule. This lateral offset is determined by the focal length of the lenses, which should also be identical, and the spacing between the two lenses, which the user may adjust to shift the convergence point of the incident projectors placed behind the viewing screen assembly 604. Clear spacing plates such as acrylic plates 611, 613 may be used between the lenses to keep their separation fixed. The designer may also insert an additional circular lenticular lens 615 (a front view detail being shown at 617) between the two outer vertical lenticular lenses to change the size of the viewing cone or angle of viewing for 3D images to be viewed by audiences in front of the screen assembly.

The video projectors 612–626 should have identical focal length lenses, resolution and aperture size, and should be anchored along a single stationary arc having an axis 632 which is orthogonal to the screen 604. With very large screens, the degree of arcing is slight. If the size of the rear screen assembly 604 is small, the arcing is more pronounced. While eight projectors 612–626 are shown, any number of projectors greater than or equal to two can be used. Screen device 604 receives the array of light beams directed towards the back of the screen, and after that array travels through several layers of lenticular lensing material sandwiched inside the screen, re-projects the projector light rays from the front of the screen with a summation of each of the projectors' rays across a widened viewing aperture. The point of convergence 636 of all of the projectors' beams is located at the intersection of a central axis 632, itself perpendicular to the plane of screen 604, and a rear surface 634 of the rear lenticular lens 605.

The rectangular pattern created on the back of the rear lenticular screen by video projectors 612–626 should be identical in size and shape, and any keystone corrections should be done electronically either within each video projector 612–626 or by software operating within the graphics cards in the imaging computer 608 or 610 driving the projectors.

In this embodiment, increasing the number of projectors 612–626 increases the number of views visible to viewers in front of the screen 604. The distance between the projectors 612–626 and convergence point 636 is determined by the size of the rectangular image they create on the rear lenticular lens 605 of screen 604, with the objective of completely filling the viewing aperture of the rear lenticular lens 605.

If the number of the projectors 612–626 is large, as in eight or more, and if the resolution of the projectors 612–626 is large, for example 1280×1024 pixels each, then the lenticular lenses themselves will be able to support a number of lines per inch greater than 50 and as high as 150, thereby increasing the total number of views perceived on the front of the screen for 3D viewing.

The typical light path for a rear projector beam first passes through the rear lenticular lens 605 at a given incident angle with respect to surface 634. The rear lenticular lens 605 then refracts this incident beam at an angle determined by the focal length of the lenticular lens 605 and the angle of the incident beam, as well as the distance of the projector from convergence point 636. The first, rear lenticular lens 605 establishes an initial number of viewing zones and directs these rays through the middle, circular lenticular lens 615, which widens the viewing zones set by the first, rear lenticular lens 605. The amount of widening is set by the focal length of this middle lens. As the ray passes through the front lenticular lens 607, which preferably is identical to the rear lens and is offset to the right or left by a fractional distance less than the width of a single lenticule, the number of contiguous perspective viewing zones is multiplied. The amount of this multiplication is determined by the number of lines per inch of the lenticular lens, the number of projectors arrayed behind the rear lenticular lens, the amount of right or left offset distance of the front lenticular lens relative to the rear lenticular lens, and the separation distance between the planes of the front and rear lenticular lenses. Usually, this multiplication factor is three times. The lenticular lenses are held firmly into flat positions by glass plates or by acrylic plates 611, 613 mounted in frames, depending on the thickness of the lenticular lenses being used. The projector array 612–626 in conjunction with screen 604 possesses the ability to repeat the total number of views delivered to the back of the screen several times in order to provide an even wider 3D convergent viewing zone for large audiences to collectively view such autostereoscopic images in a large theatre environment, or along a video wall.

In this embodiment, with eight projections 612–626 positioned behind the screen 604, a viewer in front of screen 604 would see a succession of eight stereo views of the given scene, with his or her left eye observing a left perspective view, and his or her right eye seeing a right perspective view, the view determined by the angle of view that he or she has with respect to the front surface of screen 607.

Several screens may be optically joined together to provide an immersive 3D enclosure, consisting of the screens' individual systems of lenticules, or the screen may be curved or shaped to arc around the audience's viewing perspectives. The real-time rendering facilities inherent in the distributed image processing of the invention permit the rapid movement associated with large-scale, high-resolution motion 3D viewing.

With the addition of a video multiplexer 628, autostereoscopic flat panel devices such as device 600 may be joined to the system, for smaller 3D viewing applications that don't require stereo glasses or head-tracking devices. Furthermore, a lenticular printer 630 may be added to the system to view, edit, and print lenticular photos and 3D animations created within the multi-channel imaging system. This is a particularly useful aspect of the system in that it gives the 3D lenticular work creator the ability to view artwork changes instantaneously on a 3D screen with regard to a lenticular image he is constructing, instead of having to reprint an image array many times on an inkjet or laser printer to fit the kind of 3D viewing he wishes to make.

The way in which autostereoscopic images may be delivered or constructed within the system of the invention is based on the parameters set up to control the perspective fields of the various images to be assembled. This specialized software is capable of selecting these values for a given 3D world, which may be computer generated or transferred from an external source of 3D data from digital camera sources or film photography scannings. Such controls may regulate viewing distance from a centralized scene, viewing angles, parallax adjustments between virtual cameras, the number of virtual cameras used, perspective convergence points, and the placement of objects or background material compositionally for the scene.

Since there is no upper limit to the number of viewpoints created by the system recorded source data that possess only a low number of views, or even just two views, may be expanded through a mathematical algorithm used within the system to generate more views between or among the original set of views. The results of this 3D reconstruction of an actual scene may be composited with other autostereo images in much the same way as portions of a 3D world may be joined together. For the 3D flat panel display 600, software interleaving functions that are established within the multi-channel imaging system may be used to optically join multiple perspective views in combination with a video multiplexer to support a minimum of four channels, with the upper limit regulated by the line pitch of the lenticular lens positioned on the 3D panel, as well as the flat panel 600's total screen resolution.

In summary, a real-time, animated, multiple screen display system has been shown and described in which is set up a plurality of virtual cameras, each having its own viewpoint. The present invention permits animated objects to displace themselves across multiple displays, allows changing text data to be superimposed on these images, and permits multiple screen contiguous displays of other than flat shape and capable of displaying scenes from different viewpoints.

While the present invention has been described in conjunction with the illustrated embodiments, the invention is not limited thereto but only by the scope and spirit of the appended claims.

We claim:

1. A video display system having multiple display units comprising:

A memory including a world memory in which a world is spatially defined and including at least one object to be displayed, an image memory for storing graphical image data of said at least one object, and an animation memory for storing animation sequencing instructions on the positioning and movement of said at least one object within the world;

a rendering processor coupled to the memory and including a plurality of virtual camera nodes each driving at least one of the display units, each of the virtual camera nodes associated with a stored, user-definable viewpoint into the world which includes a plurality of orientation parameters, each viewpoint capable of being chosen as different from the other ones of the viewpoints; and the rendering processor rendering images of said at least one object from the viewpoints of each of the virtual cameras according to the animation sequencing instructions, the rendering processor causing the rendered images to be displayed on respective ones of the display units.

2. The system of claim 1, wherein each viewpoint is defined by a plurality of user-selectable orientation parameters.

3. The system of claim 2, wherein the orientation parameters include an aspect ratio and a parallax setting.

4. The system of claim 2, wherein the orientation parameters include view position and viewpoint coordinate axes.

5. The system of claim 1, wherein the image memory stores a geometry file and a texture file for said at least one object.

6. The system of claim 1, wherein the rendering processor includes a general processor and a plurality of graphics processors coupled to the general processor, each graphics processor driving at least a respective one of the displays.

7. The system of claim 1, wherein the rendering processor is a portion of a rendering server connected to at least one client across a network, the rendering processor transmitting sequencing instructions to said at least one client imaging computer across the network.

8. The system of claim 1, wherein the rendering processor is a portion of a client imaging computer connected to a rendering server across a network, the rendering processor receiving sequencing instructions from the rendering server and rendering the images according to the received sequencing instructions.

9. The system of claim 1, wherein the image memory stores image data for a plurality of objects, the rendering processor rendering images of said objects.

10. The system of claim 1, whereon the memory includes a mass storage medium and an electronic random access memory.

11. The display system of claim 1, wherein the display units are contiguous to each other.

12. The display system of claim 1, wherein the rendering processor includes a general-purpose processor programmed by executable software instructions.

13. The apparatus of claim 11, wherein the rendering means includes server means for storing the animation sequencing instructions, and client means coupled to the server means for securing sequencing instructions from the server means, the client means rendering said at object as seen from the viewpoint of the virtual camera means, in response to the sequencing instructions.

14. The apparatus of claim 11, wherein the viewpoints are chosen to be parallel and spaced from each other.

15. The apparatus of claim 11, wherein the viewpoints are chosen to be spaced from each other and convergent.

16. The apparatus of claim 11, wherein the viewpoints are chosen to be spaced from each other and divergent.

17. The apparatus of claim 11, wherein each virtual camera means specifies a viewpoint by specifying an angle, a parallax value and a hither clipping plane.

18. The apparatus of claim 11, and further comprising memory means associated with the rendering means for storing geometric and textural data of said at least one object, the rendering means using the stored geometric and textural data to render said at least one object responsive to the sequencing instructions.

19. Apparatus for rendering animated images in a multiple display unit video system, comprising:
   a plurality of virtual camera means, each associated with a respective one of a plurality of display units, each virtual camera means defining a viewpoint of a scene including at least one object to be rendered, means coupled to the virtual camera means for choosing the viewpoints by a user of the apparatus such that the viewpoints may be different from each other;
   means for storing animation sequencing instructions;
   rendering means, coupled to each of the virtual camera means and the means for storing animation sequencing instructions, for rendering said at least one object as seen from the viewpoint of the virtual camera means and responsive to the animation sequencing instructions; and
   means for displaying the scene as including the rendered object on each of the display units.

20. The apparatus of claim 19, wherein each virtual camera means includes means for defining a viewpoint, the means for defining including means for specifying a viewpoint angle, parallax and hither clipping plane.

21. A method for rendering images in a multiple display unit video system, comprising the steps of:
   for each of a plurality of virtual cameras each associated with respective ones of a plurality of display units, establishing a viewpoint of a scene, each of the plurality of virtual cameras depicting the same scene from its own viewpoint, the viewpoints capable of being chosen as different from each other;
   for at least one object to be displayed in the scene, storing graphical image data;
   for said at least one object, generating a plurality of sequencing instructions;
   responsive to the sequencing instructions and using the graphical image data, rendering the object as seen from the viewpoint of each of the virtual cameras; and
   displaying the scene as including the object on each of the display units.

22. The method of claim 21, wherein the viewpoints are chosen to be parallel to and spaced from each other.

23. The method of claim 21, wherein the viewpoints are chosen to be spaced from each other and convergent.

24. The method of claim 21, wherein the viewpoints are chosen to be spaced from each other and divergent.

25. The method of claim 21, and further comprising the step of defining a viewpoint by specifying an angle, a parallax value and a hither clipping plane.

26. The method of claim 21, and further comprising the step of defining the viewpoints by a user.

27. The method of claim 21, wherein the graphical image data include geometric and textural data.

28. An animation display system having multiple display units, comprising:
   a plurality of imaging computers each having a processor, a memory, a communications link to at least one other of the imaging computers and at least one output for driving a respective video display unit;
   the memory of each imaging computer storing graphical image data for at least one object to be displayed;
   a three-dimensional scene which will be rendered by all of the imaging computers, said at least one object being displayed within the scene, and
   a plurality of viewpoints of the scene from which the object is to be displayed, the viewpoints user-definable such that they can be different from each other, each display unit having a viewpoint assigned thereto;
   wherein for each imaging computer and for each video display unit associated with the last said imaging computer, the processor renders the scene, as including said at least one object, using the viewpoint assigned to the display unit and the graphical image data.

29. The animation display system of claim 28, wherein one of the imaging computers is a server and the others of the imaging computers are clients of the server, the server storing animation sequencing instructions, the server transmitting to each of the clients the animation sequencing instructions, the processors rendering the scene according to the animation sequencing instructions.

30. The animation display system of claim 28, wherein the processor includes a main general purpose processor and, for the display unit driven by the imaging computer of that processor, a graphics processor coupled to the main processor.

31. The animation display system of claim 28, wherein a plurality of video display units are driven by each imaging computer, the processor of the imaging computer rendering the scene from each viewpoint assigned to the video display units.

32. The animation display system of claim 31, wherein the processor further includes a plurality of graphics processors driving respective ones of the display units, each graphics processor coupled to the main processor.

33. The display system of claim 28, wherein the memory of each imaging computer includes a mass storage medium and an electronic random access memory.

34. The display system of claim 28, wherein the video display units are contiguous to each other.

35. The display system of claim 28, wherein the processor includes a general-purpose processor programmed by executable software instructions.

36. An animated display system comprising:
   a central node coupled to each of a plurality of remote nodes by at least one communications link;
   an animation instruction memory of the central node storing instructions on the positioning and movement, in a virtual world, of a plurality of objects to be displayed;
   each of the plurality of remote nodes having a rendering processor, a memory, and at least one output driving a respective display unit, the last said memory including a virtual world memory storing, prior to a first time, a scene, and an object data memory storing, prior to a first time, graphical image data for each of the objects to be displayed; and
   each rendering processor rendering an image of the scene using selected ones of the object data and responsive to instructions received from the central node at the first time.

37. The animated display system of claim 36, wherein the central node further comprises a rendering processor, at least one output driving a respective display unit, a virtual world memory storing, prior to the first time, a scene, and an object data memory storing, prior to the first time, the graphical image data for each of the objects to be displayed, the rendering processor using the instructions in the animation instruction memory to render an image of the scene using selected ones of the object data.

38. The animated display system of claim 36, wherein each rendering processor includes a general purpose processor programmed by executable software instructions.

39. The animated display system of claim 36, wherein each rendering processor includes a central processor and, for driving the display unit, a graphics processor coupled to the central processor.

40. The animated display system of claim 36, wherein each remote node has a plurality of outputs driving respective display units, the rendering processor of the remote node rendering an image of the scene for each of the display units, the image rendered for any one of the display units controlled by the last said rendering processor capable of being preselected to be different from any other of the rendered images.

41. The animated display system of claim 40, wherein the rendering processor in each of the remote units comprises a central general purpose processor and, for each of the display units controlled by the rendering processor, a graphics processor coupled to the general purpose processor.

42. The animated display system of claim 36, wherein the scene is three-dimensional.

43. The animated display system of claim 36, wherein the graphical image data include geometric and textural data.

44. The animated display system of claim 36, wherein the animation instruction memory includes a mass storage medium.

45. The animated display system of claim 36, wherein each virtual world memory includes a mass storage medium.

46. Apparatus for rendering images in a multiple display unit video system, comprising:
   means for storing animation sequencing instructions at a central location;
   a plurality of remote locations in communication with the central location, each of the remote locations including means for storing, prior to a first time, graphical image data for each of a plurality of objects to be displayed, means for storing, prior to the first time, a scene in which the objects are to be depicted, image rendering means coupled to the means for storing, and at least one display unit driven by the image rendering means;
   each remote location receiving, at the first time and from the central location, sequencing instructions, the image rendering means at each remote location rendering an image of the scene using selected elements of the graphical image data and the stored scene and responsive to the sequencing instructions, said at least one display displaying the image rendered by the image rendering means.

47. The apparatus of claim 46, wherein the central location also has said means for storing graphical image data, said means for storing the scene, an image rendering means, and at least one display unit, the display unit driven by the image rendering means, responsive to the sequencing instructions, and using the stored scene and selected elements of the graphical image.

48. The apparatus of claim 46, wherein each of the remote locations is coupled to a plurality of display units, the image rendering means of each of the remote locations rendering an image for each of the display units driven thereby, viewpoints of the images preselectable to be different from one another.

49. The apparatus of claim 48, wherein each of the remote locations includes memory means for storing a plurality of viewpoints of the scene, each viewpoint being linked to at least one station identity, each station identity associated with a display unit, the sequencing instructions received by each remote location including the station identities to be attributed to the display units associated with the remote location, the remote location establishing viewpoints for each of the display units according to the received station identities.

50. The apparatus of claim 46, wherein the graphical image data include geometric and textural data.

51. A multiple-panel animation and text data display system, comprising:
   a server node having a processor and a memory, a first link of the central node coupled to a remote source of text data, a listen thread of the processor inspecting the first link for incoming text data to be displayed;
   a plurality of client nodes each coupled to the server node and having a processor and a memory, at least one display coupled to each of the client nodes;
   the server node and client nodes each storing, in memories associated with said nodes, scenes and object imaging data, the server node further storing animation sequencing instructions and transmitting said instructions to each of the client nodes, the server and the clients rendering animated scenes using the sequencing instructions and the stored scene and object imaging data;
   the server node determining, according to stored instructions, a text overlay area on selected ones of the displays; and
   the server node determining which text data should appear on which overlay area, the server node transmitting selected text data to corresponding ones of the client nodes such that the displays coupled to respective client nodes can display selected animation graphics and selected, overlaid text data.

52. The animation and text data display system of claim 51, wherein the server node further has an internet link permitting an administrator to remotely monitor and modify the displayed animation and text data.

53. The animation and text display system of claim 51, wherein said server node is one of a plurality of rendering nodes, the rendering nodes being coupled to each other, ones of said rendering nodes having world memories storing different spatial world definitions, each of the worlds being respective portions of a universe which is so defined that the worlds may share common data.

* * * * *